(12) United States Patent
Ogura

(10) Patent No.: US 7,233,406 B2
(45) Date of Patent: Jun. 19, 2007

(54) IMAGE FORMING DEVICE MANAGEMENT SYSTEM AND METHOD

(75) Inventor: Masaaki Ogura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 871 days.

(21) Appl. No.: 09/771,883

(22) Filed: Jan. 30, 2001

(65) Prior Publication Data

US 2002/0080390 A1    Jun. 27, 2002

(30) Foreign Application Priority Data

Jan. 31, 2000  (JP)  ............................. 2000-022928
Jan. 12, 2001  (JP)  ............................. 2001-005675

(51) Int. Cl.
*B41B 27/00* (2006.01)

(52) U.S. Cl. ................... 358/1.14; 358/1.14; 358/1.15; 710/1; 710/14; 710/15; 710/16

(58) Field of Classification Search ............... 358/1.14, 358/1.15; 379/98; 315/406; 710/1, 15–16
See application file for complete search history.

(56) References Cited

U.S. PATENT DOCUMENTS

| | | | |
|---|---|---|---|
| 4,051,326 A | | 9/1977 | Badagnani et al. |
| 5,343,516 A | * | 8/1994 | Callele et al. ............ 379/93.05 |
| 5,727,248 A | | 3/1998 | Ogura |
| 5,828,462 A | * | 10/1998 | Hashimoto et al. .......... 358/296 |
| 6,334,719 B1 | * | 1/2002 | Kimura ........................ 400/54 |
| 6,407,826 B2 | * | 6/2002 | Hashimoto et al. .......... 358/296 |
| 6,459,496 B1 | * | 10/2002 | Okazawa ................... 358/1.14 |
| 6,495,979 B2 | * | 12/2002 | Park et al. .................. 315/406 |

FOREIGN PATENT DOCUMENTS

| | | |
|---|---|---|
| EP | 0 835 008 | 4/1998 |
| JP | 9-26730 | 1/1997 |
| WO | WO 99/03033 | 1/1999 |
| WO | WO 99/66655 | * 12/1999 |

* cited by examiner

*Primary Examiner*—Aung S. Moe
*Assistant Examiner*—Peter K. Huntsinger
(74) *Attorney, Agent, or Firm*—Oblon, Spivak, McClelland, Maier & Neustadt, P.C.

(57) ABSTRACT

In an image forming device management system and method of the present invention, a data communication device is connected to one or a plurality of image forming devices and a central control system is connected to the data communication device via a public switched telephone network and provides a remote maintenance of the one or the plurality of image forming devices through the telephone network and the data communication device. A communication request signal is transmitted from the data communication device to the image forming device concerned. When the request signal is received by the image forming device concerned, a supplying of a power from a main power source to the image forming device concerned is automatically turned on. The supplying of the power from the main power source to the image forming device concerned is automatically turned off after a communication between the data communication device and the image forming device concerned ends.

22 Claims, 19 Drawing Sheets

FIG.14A
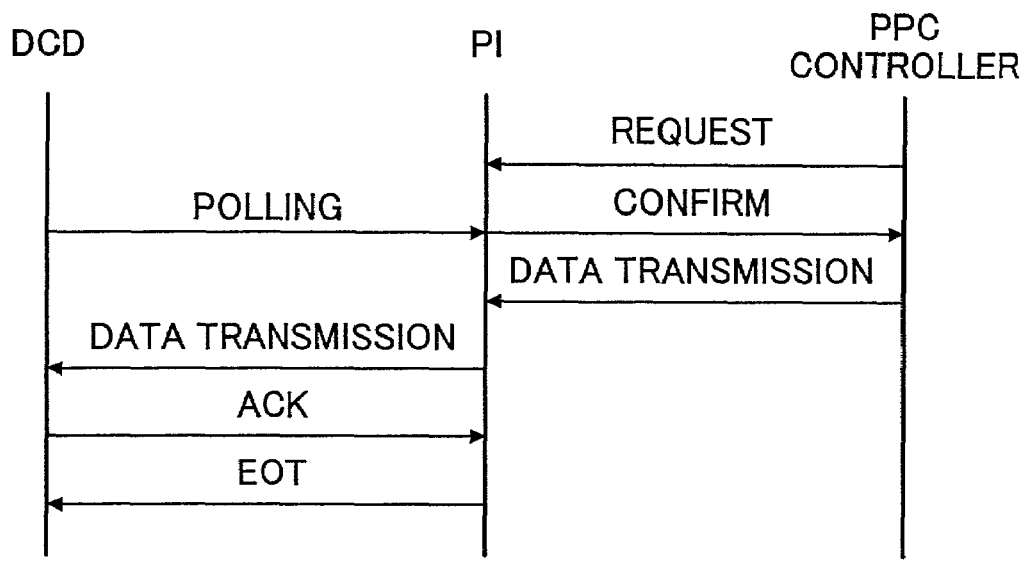
FIG.14B
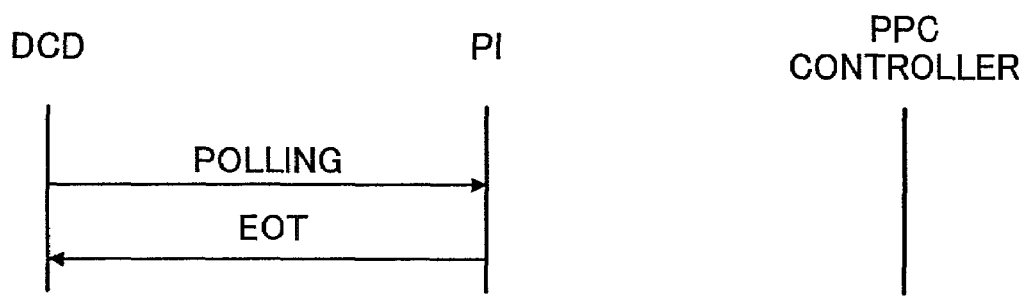
FIG.14C
| SYN | 1 | * | ENQ |
|---|---|---|---|
SYN: 16H
1 : 31H
* : DEVICE CODE(0~V)
ENQ: 05H

FIG.16A
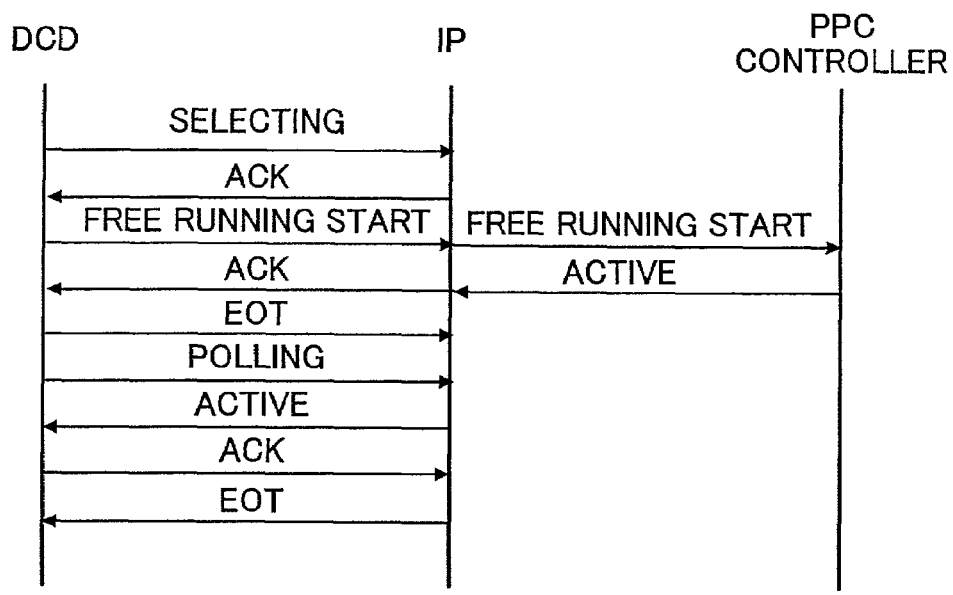
FIG.16B
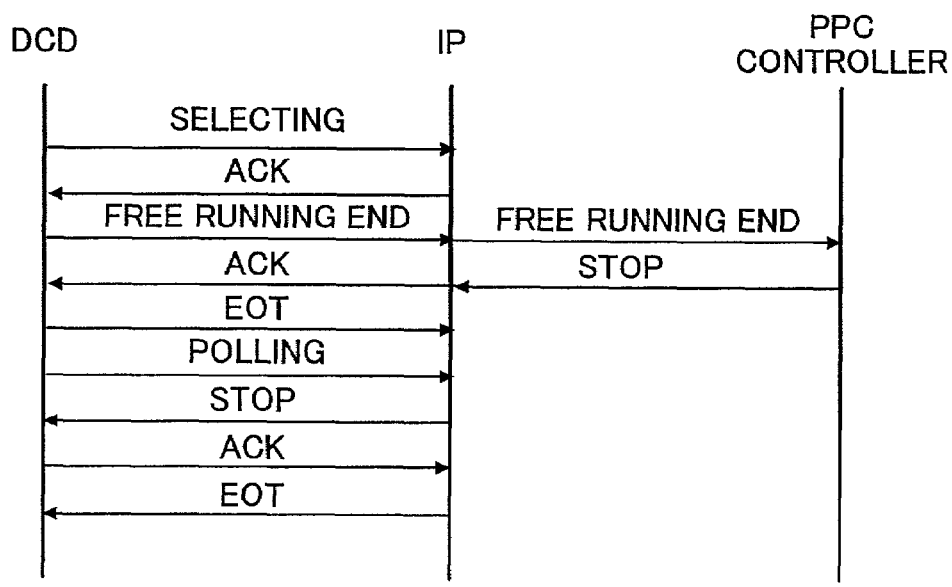
FIG.16C
| SYN | 2 | * | ENQ |
|---|---|---|---|
SYN: 16H
  2 : 32H
  * : DEVICE CODE(0~V)
ENQ: 05H

| SYN | SOH | SN | STX | P/S PORTION SELECTION INFORMATION | I/P REQUEST INFORMATION (FTS REQUEST) | ETX | LRC |

FIG.21A

| BIT | P/S PORTION SELECTION INFORMATION | REMARKS |
|---|---|---|
| 0 | OPERATION  1;ON,0;OFF | |
| 1 | FIXING  1;ON,0;OFF | |
| 2 | ADF  1;ON,0;OFF | |
| 3 | SORTER  1;ON,0;OFF | |
| 4 | | |
| 5 | | |
| 6 | | |
| 7 | | |

FIG.21B

| I/P REQUEST INFORMATION (FTS REQUEST) | REMARKS |
|---|---|
| 5101105020000 | |

FIG.22

| SYN | SOH | SN | STX | P/S PORTION SELECTION INFORMATION | ETX | LRC |
|---|---|---|---|---|---|---|

# IMAGE FORMING DEVICE MANAGEMENT SYSTEM AND METHOD

BACKGROUND OF THE INVENTION

1. Field of the Invention

The present invention relates to an image forming device management system and method wherein one or a plurality of image forming devices, such as copiers and printers, are connected to a data communication device within a customer system, the data communication device is connected to a central control system via a public switched telephone network.

2. Description of the Related Art

Conventionally, an image forming device management system of the above type is known, and, in such image forming device management system, the central control system (or a host computer) provides a remote maintenance of one or the plurality of image forming devices, which are located within each individual customer system, through the telephone network and the data communication device.

In a conventional image forming device management system of the above type, many image forming devices are designed to have an automatic power-off function. In such an image forming device with the automatic power-off function, when the image forming device stays in an inactive condition for a long period, exceeding a given reference period, after an end of an image forming action (copying action) of the image forming device, the supply of electric power from a power source to the image forming device is cut off for the purpose of reduction of the power consumption.

In the image forming device that is provided in the conventional image forming device management system of the above type, when a main switch of the image forming device is turned off by the operator or when the automatic power-off function is effected in order to reduce the power consumption, the supply of electric power from the power source to the image forming device is cut off. Hence, there is a problem that the image forming device, which is held in such power-off state, is unable to respond to a call or a communication request signal sent by the data communication device.

In addition, the data communication device usually functions to transmit the current setting of internal parameters of the image forming device to the central control system via the telephone network by sending, at a preprogrammed time, a call to the image forming device. However, if the image forming device is held in such power-off state as described above, the image forming device does not respond to the call sent by the data communication device. Consequently, the data communication device is unable to transmit the current setting of internal parameters of the image forming device to the central control system.

SUMMARY OF THE INVENTION

It is an object of the present invention to provide an improved image forming device management system and method that overcome the above-described problems.

Another object of the present invention is to provide an image forming device management system that can always start the communication between the data communication device and the image forming device concerned even if the image forming device concerned is temporarily held in a power-off state.

Another object of the present invention is to provide a data communication device for use in an image forming device management system, which can always start the communication with the image forming device concerned even if the image forming device concerned is temporarily held in a power-off state.

Another object of the present invention is to provide an image forming device for use in an image forming device management system, which can always start the communication with the data communication device even if the image forming device is temporarily held in a power-off state.

Another object of the present invention is to provide an image forming device management method that can always start the communication between the data communication device and the image forming device concerned even if the image forming device concerned is temporarily held in a power-off state.

The above-mentioned objects of the present invention are achieved by an image forming device management system in which a data communication device is connected to one or a plurality of image forming devices and a central control system is connected to the data communication device via a public switched telephone network and provides a remote maintenance of the one or the plurality of image forming devices through the telephone network and the data communication device, the image forming device management system comprising the one or the plurality of image forming devices, the data communication device, and the central control system, wherein each image forming device comprises a power-source on/off control unit which automatically turns on, when a communication request signal sent by the data communication device is received by the image forming device, a supplying of a power from a main power source to the image forming device concerned, and the power-source on/off control unit automatically turning off the supplying of the power from the main power source to the image forming device after a communication between the data communication device and the image forming device ends.

The above-mentioned objects of the present invention are achieved by a data communication device for use in an image forming device management system, the data communication device being connected to one or a plurality of image forming devices and a central control system being connected to the data communication device via a public switched telephone network and providing a remote maintenance of the one or the plurality of image forming devices through the telephone network and the data communication device, the data communication device comprising a request signal transmission unit which transmits a communication request signal to the image forming device concerned among the one or the plurality of image forming devices, and the image forming device concerned automatically turning on, when the request signal is received by the image forming device concerned, a supplying of a power from a main power source to the image forming device concerned.

The above-mentioned objects of the present invention are achieved by an image forming device for use in an image forming device management system wherein a data communication device is connected to the image forming device and a central control system is connected to the data communication device via a public switched telephone network and provides a remote maintenance of the image forming device through the telephone network and the data communication device, the image forming device comprising a power-source on/off control unit which automatically turns on, when a communication request signal sent by the data communication device is received by the image forming device, a supplying of a power from a main power source to the image forming device concerned, and the power-source on/off control unit automatically turning off the supplying of the power from the main power source to the image forming device after a communication between the data communication device and the image forming device ends.

The above-mentioned objects of the present invention are achieved by an image forming device management method in which a data communication device is connected to one or a plurality of image forming devices and a central control system is connected to the data communication device via a public switched telephone network and provides a remote maintenance of the one or the plurality of image forming devices through the telephone network and the data communication device, the method comprising the steps of: transmitting a communication request signal from the data communication device to the image forming device concerned; automatically turning on, when the request signal is received by the image forming device concerned, a supplying of a power from a main power source to the image forming device concerned; and automatically turning off the supplying of the power from the main power source to the image forming device concerned after a communication between the data communication device and the image forming device concerned ends.

In the image forming device management system and method according to the present invention, even when a main switch of the image forming device concerned is turned off by the operator or when the automatic power-off function is effected in order to reduce the power consumption, the main power source is automatically turned on upon receipt of a communication request signal sent by the data communication device, and the supplying of the power from the main power source to the image forming device concerned is automatically turned off after a communication between the data communication device and the image forming device concerned ends. Accordingly, the image forming device management system and method of the present invention can always start the communication between the data communication device and the image forming device concerned even if the image forming device concerned is temporarily held in a power-off state.

BRIEF DESCRIPTION OF THE DRAWINGS

Other objects, features and advantages of the present invention will be apparent from the following detailed description when read in conjunction with the accompanying drawings.

FIG. 14A, FIG. 14B and FIG. 14C are diagrams for explaining a communication sequence between the data communication device, the personal interface and the PPC controller of the image forming device when a polling process is performed.

FIG. 16A, FIG. 16B and FIG. 16C are diagrams for explaining a communication sequence between the data communication device, the personal interface and the PPC controller of the image forming device when a selecting process is performed to start or terminate a specific operational mode of the image forming device.

FIG. 21A and FIG. 21B are diagrams showing the details of power-supplied portion selection information and internal parameter request information included in the internal parameter request signal shown in FIG. 20.

FIG. 22 is a diagram for explaining a format of a power-supplied portion selection signal which may be sent from the data communication device to the image forming device after the reading or updating of the internal parameters of the image forming device is finished.

DETAILED DESCRIPTION OF PREFERRED EMBODIMENTS

A description will now be provided of preferred embodiments of the present invention with reference to the accompanying drawings.

Figure 1:
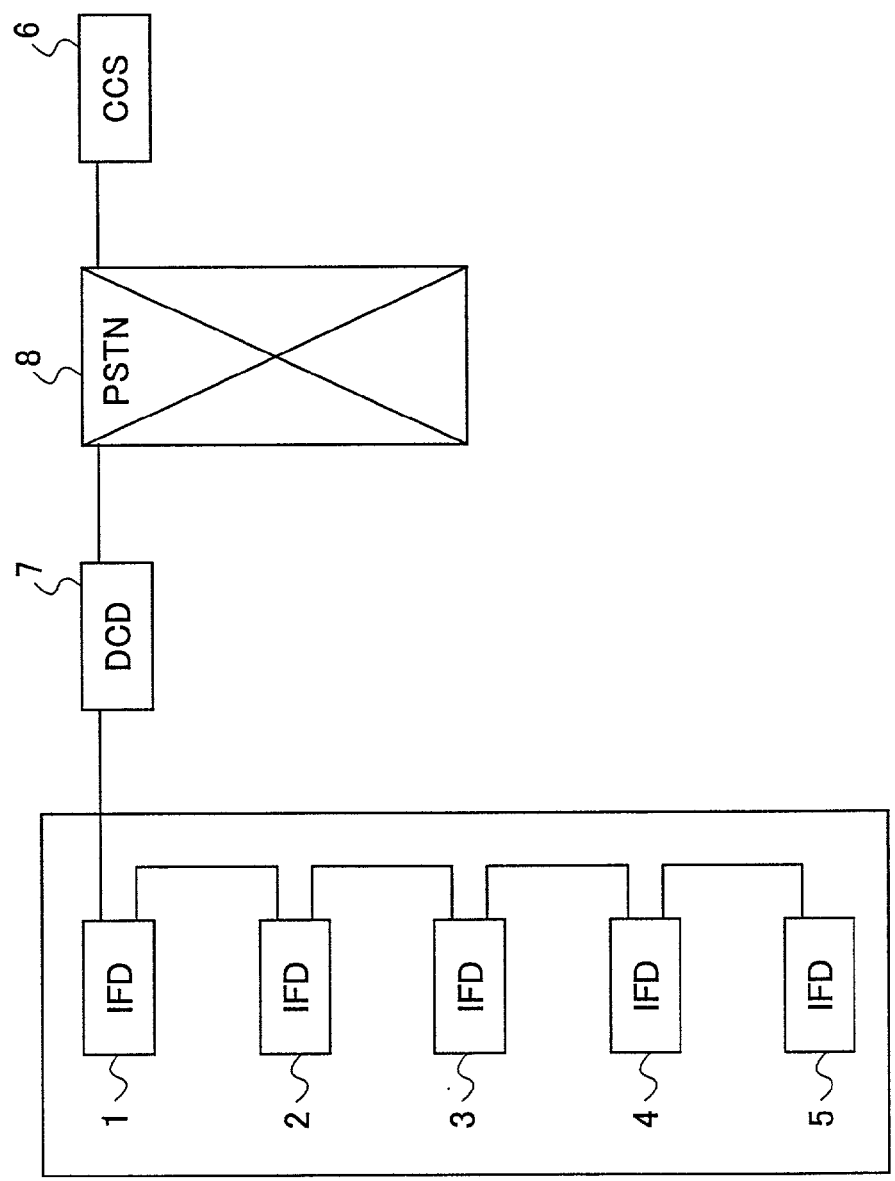
FIG. 1 is a block diagram of one preferred embodiment of the image forming device management system of the present invention.

FIG. 1 shows one preferred embodiment of the image forming device management system of the present invention.

As shown in FIG. 1, the image forming device management system of the present embodiment generally comprises a plurality of image forming devices (IFD) 1 through 5 (which are, for example, copiers), a data communication device (DCD) 7 which connects the image forming devices 1-5 to a public switched telephone network (PSTN) 8, and a central control system (CCS) 6 which is connected to the DCD 7 via the PSTN 8.

For the sake of convenience of description, the five image forming devices 1 through 5 are provided in the present embodiment. However, the number of the image forming devices included in the image forming device management system is freely selectable, and an arbitrary number of image forming devices may be included in the image forming device management system so as to suit the demands of a customer system.

In the image forming device management system of FIG. 1, the image forming devices (IFD) 1-5 and the data communication device 7 are provided in a customer system. The central control system (CCS) 6, which is located at a place remote from the customer system, is configured to carry-out a remote maintenance of the image forming devices 1-5 in a concentrated manner through the PSTN 8 and the DCD 7.

The data communication device (DCD) 7 transmits a command signal, received from the central control system 6 via the PSTN 8, to any of the image forming devices 1-5. On the other hand, the data communication device (DCD) 7 transmits a data signal or a message, sent by any of the image forming devices 1-5, to the central control system 6 via the PSTN 8.

In the image forming device management system of FIG. 1, power is always supplied to the data communication device 7 for 24 hours. Even during the night hours the image forming devices 1-5 are turned off, the data communication device 7 is always powered and can communicate with the central control system 6 via the PSTN 8. The data communication device 7 and the image forming devices 1-5 are connected together by a multi-drop connection using RS-485 interfaces, and a communication between the data communication device and the image forming devices 1-5 is carried out through a polling process or a selecting process that is carried out by the data communication device 7 for the image forming devices 1-5.

Figure 2:
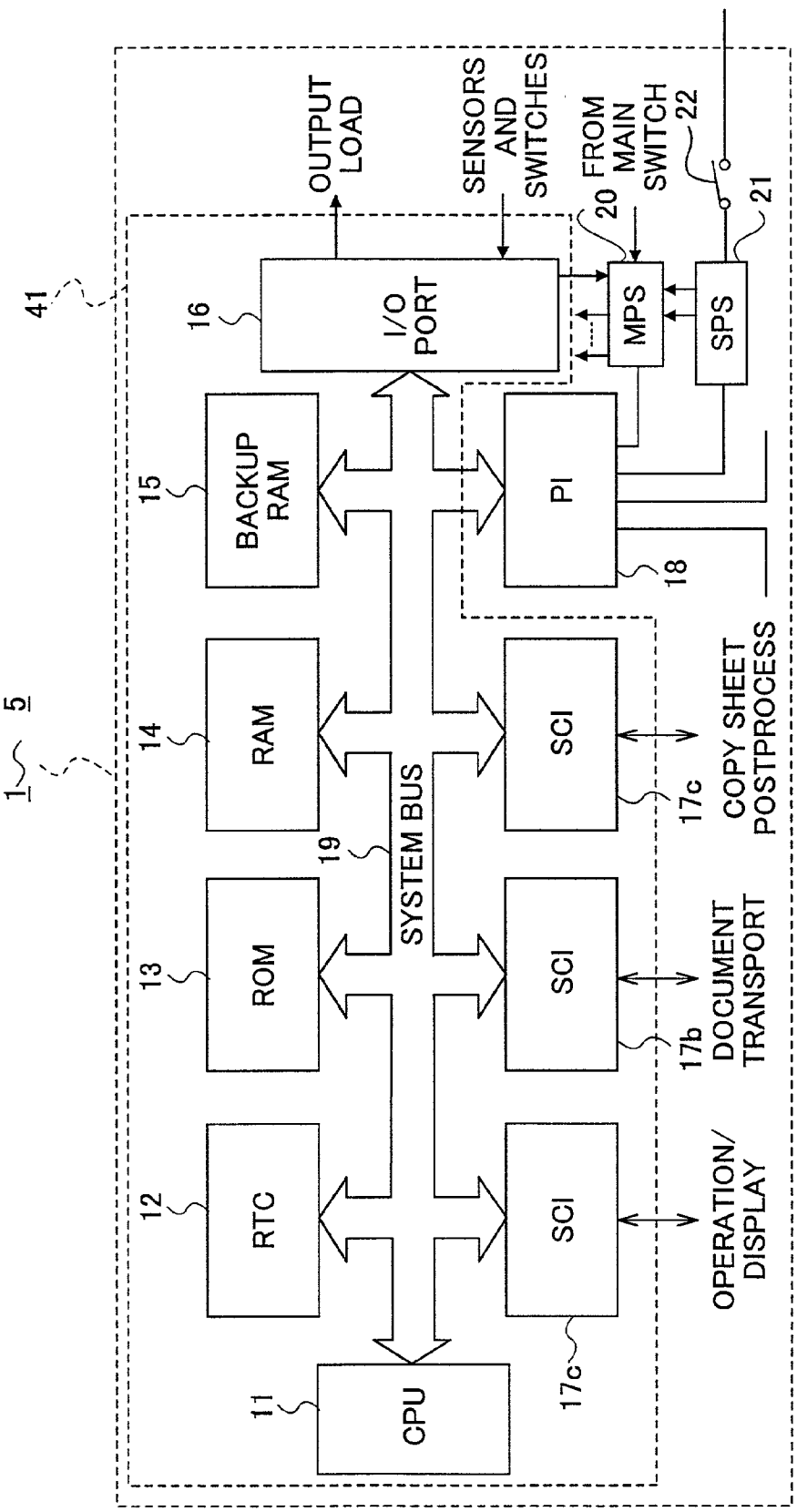
FIG. 2 is a block diagram of an image forming device in the image forming device management system of FIG. 1.

FIG. 2 shows a configuration of one of the image forming devices 1 through 5 in the image forming device management system of FIG. 1.

As shown in FIG. 2, the image forming device of the present embodiment generally includes a PPC (plain paper copier) controller 41, a personal interface (PI) 18, a main power source (MPS) 20, a sub-power source (SPS) 21, and a backup switch 22. The PPC controller 41 generally comprises a CPU (central processing unit) 11, a RTC (real-time clock) 12, a ROM (read-only memory) 13, a RAM (random access memory) 14, a backup RAM 15, an I/O (input/output) port 16, a set of SCIs (serial communication interfaces) 17a, 17b and 17c, and a system bus 19.

In the image forming device of FIG. 2, the CPU 11 controls the elements of the image forming device in accordance with control program code instructions stored in the ROM 13. The RTC 12 provides the current time information for the image forming device. The CPU 11 detects the current time information by accessing the RTC 12. The ROM 13 provides a storage area of the control program code instructions for the CPU 11 and a storage area of various kinds of other fixed information for operational and control programs.

In the image forming device of FIG. 2, the RAM 14 provides a working storage area to temporarily store data used by the CPU 11 when performing a data processing. The backup RAM 15 provides a storage area of various kinds of mode indications for an operation/display portion (which will be described later with reference to FIG. 4). Power from a battery (not shown) is always supplied to the backup RAM 15, and the information of mode indications is retained by the backup RAM 15 even when the image forming device is turned off. The I/O port 16 provides the output load interfaces between the CPU 11 and the mechanical portions (such as motors, solenoid coils and clutches) of the image forming device. Further, the I/O port 16 provides the input interfaces between the CPU 11 and the sensors and switches of the image forming device.

In the image forming device of FIG. 2, the SCI 17a receives a signal from and/or transmits a signal to the operation/display portion (not shown in FIG. 2) of the image forming device. The SCI 17b receives a signal from and/or transmits a signal to a document transport portion (not shown in FIG. 2) of the image forming device. The SCI 17c receives a signal from and/or transmits a signal to a copy-sheet post-process portion (not shown in FIG. 2) of the image forming device.

Further, in the image forming device of FIG. 2, the personal interface (PI) 18 is an interface circuit that controls communication of the image forming device with the data communication device 7. The PI 18 is provided to reduce the processing load of the CPU 11 needed to communicate with the data communication device 7. Alternatively, if the CPU 11 is provided with an adequately high ability to communicate with the data communication device 7, the functions of the PI 18 may be incorporated into the CPU 11.

The personal interface (PI) 18 in the image forming device of FIG. 2 provides the following major functions (1) through (4).

(1) Monitoring of the polling and selecting processes performed by the data communication device 7.

(2) Sending an acknowledgement (ACK) or a negative acknowledgement (NAK) to the data communication device 7.

(3) Checking the correctness of data received from or sent to the data communication device 7, the parity checking and sending a request for re-transmission of data to the data communication device 7 upon occurrence of an error.

(4) Detecting the header information of data received from or sent to the data communication device 7.

Further, in the image forming device of FIG. 2, the system bus 19 is constituted by an address bus, a control bus and a data bus, and provided to interconnect the CPU 11, the RTC 12, the ROM 13, the RAM 14, the backup RAM 15, the I/O port 16, the SCIs 17a-17c, and the PI 18. As shown in FIG. 2, the PPC controller 41 and the PI 18 are interconnected by the system bus 19, and the data communication between the PPC controller 41 and the PI 18 is carried out by using the system bus 19.

Further, in the image forming device of FIG. 2, the main power source (MPS) 20 is turned on when a main switch of the image forming device is turned on by the operator. Also, when the PI 18 sends an MPS control signal (or a power-on signal) to the MPS 20, the MPS 20 is turned on by the MPS control signal and starts the supplying of an electric power from the MPS 20 to the respective portions of the image forming device.

Further, when the image forming device continuously stays in an inactive state for a long time period, exceeding a given reference period, after an image forming action (copying action) is terminated by the image forming device, the PI 18 sends an MPS control signal (or a power-off signal) to the MPS 20 so that the MPS 20 is turned off by the MPS control signal and stops the supplying of the power from the MPS 20 to the image forming device. Further, when the main switch of the image forming device is turned off by the operator, the MPS 20 is turned off and stops the supplying of the power from the MPS 20 to the image forming device.

Further, in the image forming device of FIG. 2, the sub-power source (SPS) 21 is a power source that supplies a small electric power to the PI 18 and the MPS 20. When the backup switch 22 is turned on, the SPS 21 is turned on to activate both a starting circuit of the PI 18 and a starting circuit of the MPS 20 by supplying the small electric power to them. As long as the backup switch 22 is set in the on state, the SPS 21 continuously supplies the small electric power to both the PI 18 and the MPS 20.

Figure 3:
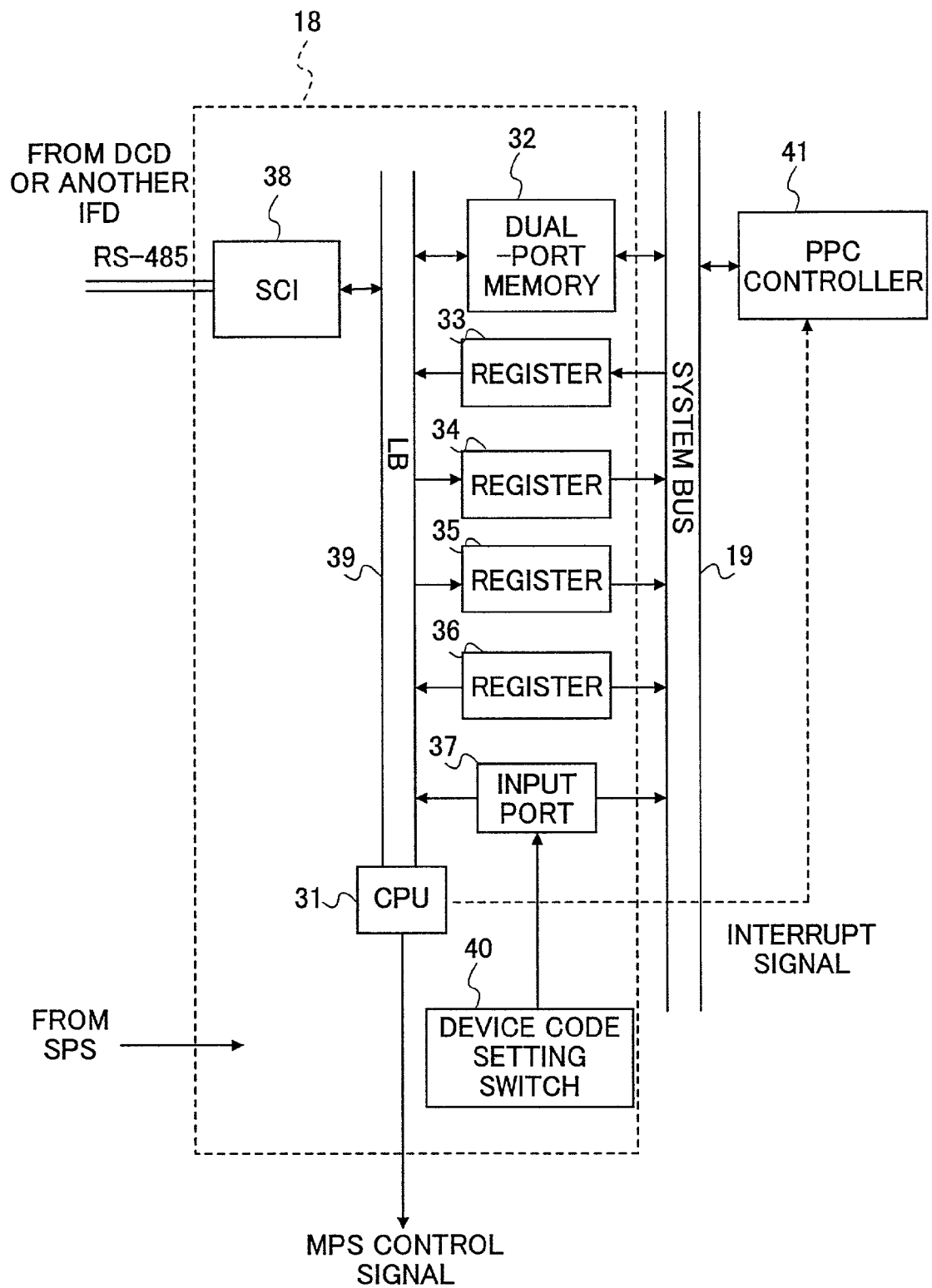
FIG. 3 is a block diagram of a personal interface in the image forming device of FIG. 2.

FIG. 3 shows a configuration of the PI 18 in the image forming device of FIG. 2.

As shown in FIG. 3, the PI 18 of the present embodiment generally comprises a CPU (central processing unit) 31, a dual-port memory 32, a set of registers 33 through 36, an input port 37, a SCI (serial communication interface) 38, a LB (local bus) 39, and a device-code setting switch 40.

In the PI 18 of FIG. 3, the CPU 31 is a one-chip microcomputer including a ROM, a RAM and an I/O interface. The CPU 31 controls the elements of the entire-PI 18. The dual-port memory 32 provides a storage area the information of which can be accessed by either the CPU 31 or the CPU 11 of FIG. 2. The dual-port memory 32 is accessed by either the CPU 31 or the CPU 11 of FIG. 2 when a text data is exchanged between the PI 18 and the PPC controller 41.

The PPC controller 41 of FIG. 3 is constituted by the above CPU 11, the RTC 12, the ROM 13, the RAM 14, the backup RAM 15, the I/O port 16 and the SCIs 17*a*, 17*b* and 17*c* as indicated by the dotted line in FIG. 2. The registers 33 through 36 in the PI 18 of FIG. 3 are used for control when a text data is exchanged between the PI 18 and the PPC controller 41, and a detailed description of the registers 33-36 will be omitted.

In the PI 18 of FIG. 3, the device-code setting switch 40 is provided to set a specific device code of the image forming device in which the PI 18 is provided. The device code of each of the image forming devices 1 through 5 in the image forming device management system of FIG. 1 is detected to identify each image forming device when the polling process or the selecting process is performed by the data communication device 7. The SCI 38 is connected to the data communication device 8 and/or the PI 18 of another image forming device.

In the image forming device management system of the present invention, the CPU 11 of each of the image forming devices 1 through 5 and the CPU 31 of the PI 18 of each of the image forming devices 1 through 5 constitute the power-source on/off control unit and the signal send-back unit as set forth in the claims.

Figure 4:
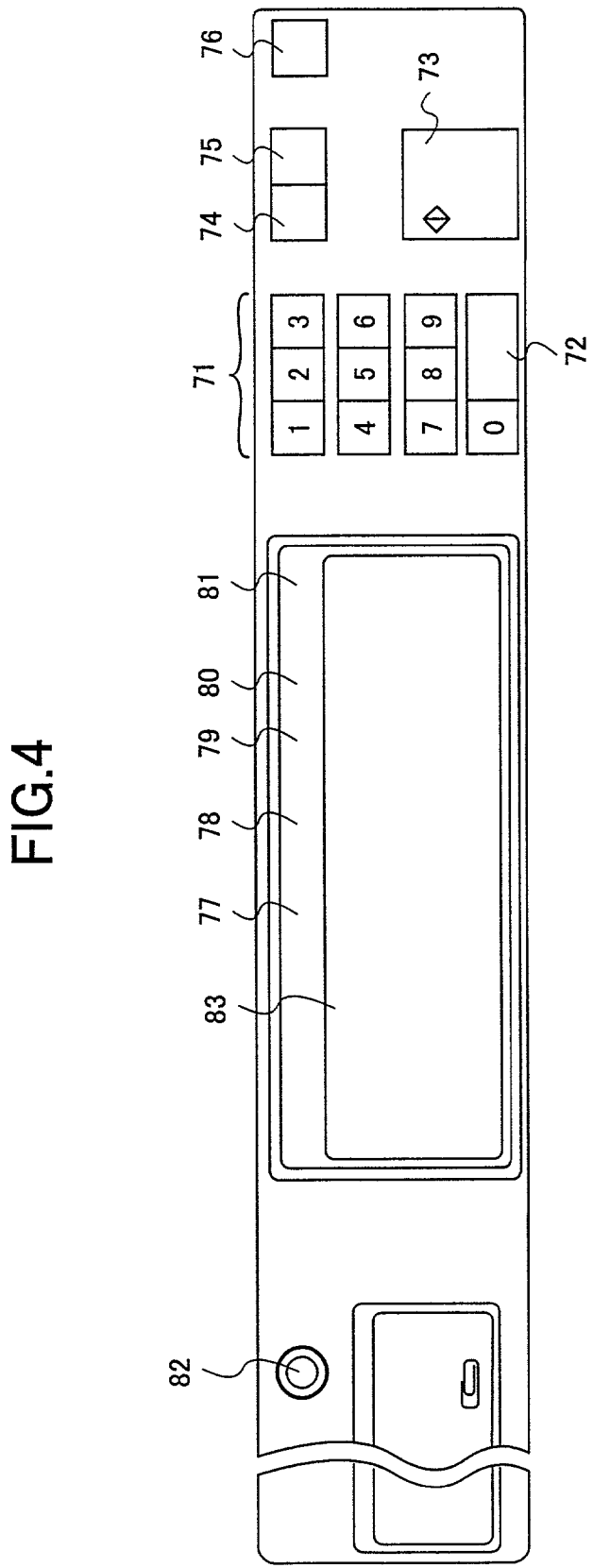
FIG. 4 is a diagram showing an operation/display portion in the image forming device of FIG. 2.

FIG. 4 shows an operation/display portion in the image forming device of FIG. 2.

Similar to the configuration of the control portion of the image forming device (such as the PPC controller 41 shown in FIG. 2), the operation/display portion of the present embodiment includes a control part (not shown) that generally comprises a CPU controlling the operation/display portion, a ROM storing program code instructions for the CPU, a RAM providing a working storage area for the CPU, a backup RAM providing a storage area of various kinds of mode indications for the operation/display portion, an SCI, and an I/O port.

The operation/display portion receives a data signal from and/or sends a data signal to the SCI 17*a* as shown in FIG. 2, and a detailed description of the control part of the operation/display portion of the present embodiment will be omitted.

As shown in FIG. 4, the operation/display portion of the present embodiment generally includes, in addition to the above-mentioned control part, a set of ten keys 71, a clear/stop key 72, a print key 73, an enter key 74, an interrupt key 75, an preheat/mode clear key 76, a mode confirm key 77, a window change key 78, a call key 79, a registration key 80, a guidance key 81, a display contrast volume 82, and a character display unit 83.

In the operation/display portion of FIG. 4, the ten keys 71 are provided to input the number of copies to be formed or input the number of a scaling factor. The clear/stop key 72 is provided to cancel an input number of the character display unit 83, such as the number of copies, or to stop an image forming operation of the image forming device. The print key 73 is provided to start an image forming operation of the image forming device. The enter key 74 is provided to determine an input number, such as a zooming factor or a staple size setting number. The interrupt key 75 is provided to insert another document copying operation in the current copying operation. The preheat/mode clear key 76 is provided to cancel all the previously set operations modes or to set a preheat mode of the image forming device for economy of power consumption.

In the operation/display portion of FIG. 4, the mode confirm key 77 is provided to display a list of several image forming modes on the character display unit 83. The window change key 78 is provided to select one of a set of different types of display window formats for the character display unit 83. The call key 79 is provided to call a user-defined control program.

In the operation/display portion of FIG. 4, the registration key 80 is provided to register a user-defined control program into the operation/display portion of the image forming device. The guidance key 81 is provided to display a guidance message on the character display unit 83. The display contrast volume 82 is provided to adjust the contrast of the character display unit 83.

Further, in the operation/display portion of FIG. 4, the character display unit 83 employs a liquid crystal device (LCD) or a full-dot fluorescent display device. A matrix touch panel of a generally transparent sheet which a number of touch sensors (one of which is provided for a matrix of 8×8 picture elements) are built in is overlapped onto the LCD or the like.

Figure 5:
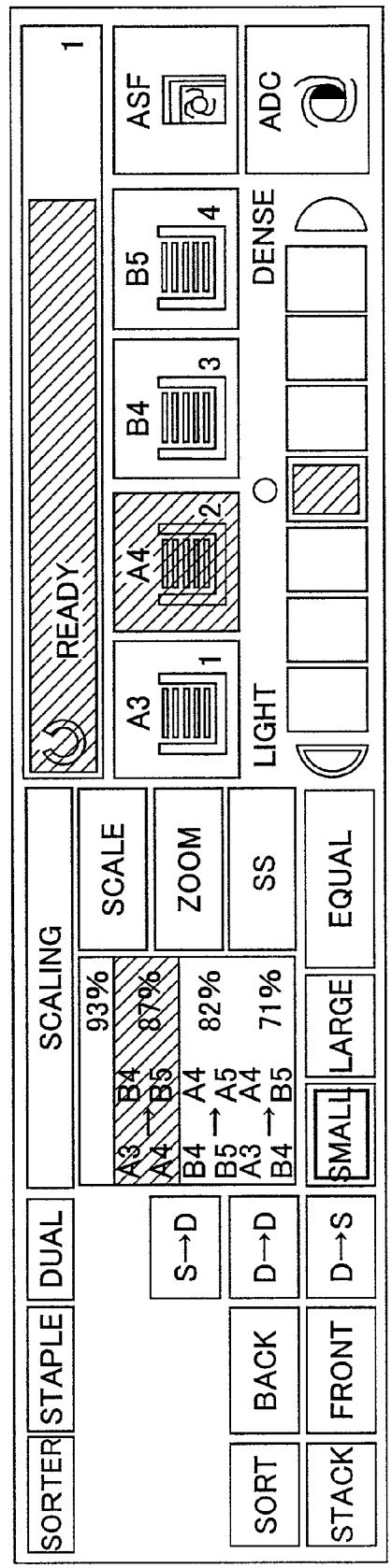
FIG. 5 is a diagram of an image-forming mode window of a character display in the operation/display portion of FIG. 4.

FIG. 5 shows an image-forming mode window of the character display unit 83 in the operation/display portion of FIG. 4. This image-forming mode window appears on the character display unit 83 of the operation/display portion when a power switch of the image forming device is turned on.

The operator of the image forming device can select a desired one or a desired number of the sheet sizes, the optical densities, the scaling factors, the single or dual mode, the staple mode or the sorter mode by depressing one of a number of touch keys of the character display unit 83 as shown in FIG. 5. The display mode of a touch key that is depressed by the operator is turned from white into black or vice versa.

Figure 6:
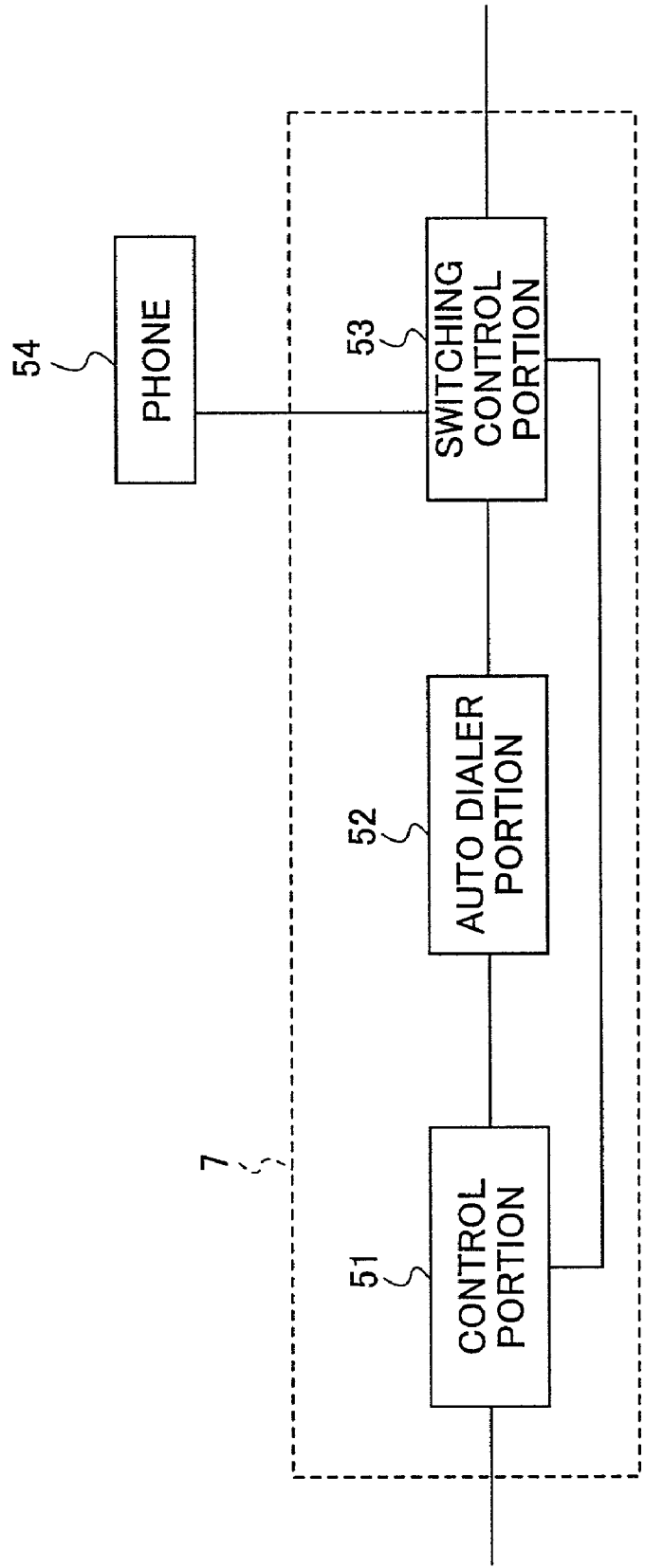
FIG. 6 is a block diagram of a data communication device in the image forming device management system of FIG. 1.

FIG. 6 shows a configuration of the data communication device 7 in the image forming device management system of FIG. 1.

As shown in FIG. 6, the data communication device 7 of the present embodiment generally comprises a control portion 51, an auto dialer portion 52, and a switching control portion 53. The control portion 51 controls the plurality of image forming devices 1 through 5, and controls the reception of a command signal, which is transmitted by the central control system 6 via the PSTN 8.

In the data communication device 7 of FIG. 6, the auto dialer portion 52 sends a call to the central control system 6 in accordance with the messages sent by the image forming devices 1-5. The switching control portion 53 carries out a switching control for connecting the control portion 51 to either an external telephone unit 54 or to the PSTN 8.

Similar to the configuration of the control portion of the image forming device such as that shown in FIG. 2, the control portion 51 of the present embodiment generally comprises a CPU controlling the data communication device 7, a ROM storing program code instructions for the CPU, a RAM providing a working storage area for the CPU, a backup RAM, an SCI, an I/O port, and a RTC. The backup RAM of the control portion 51 provides a storage area for storing a text data transmitted between the data communication device 7 and the central control system 6, the respective device codes and ID codes of the image forming devices 1-5, a phone number of the central control system 6 (or the call destination), the maximum number of calls, the calling interval, and other parameters.

Next, a description will be provided of the major functions of the image forming device management system of the present embodiment.

The image forming device management system of the present embodiment has three major functions:

(1) the control of communications from the central control system 6 to the image forming devices 1-5;

(2) the control of communications from the image forming devices 1-5 to the central control system 6 or to the data communication device 7; and (3) the control of the data communication device 7 itself.

Regarding the control of communications from the central control system 6 to the image forming devices 1-5 as mentioned in the above item (1), the image forming device management system of the present embodiment provides the following three functions (a) through (c).

(a) Reading and resetting of various items including a total copy count of a corresponding one of the image forming devices 1-5, respective copy counts for a plurality of sheet feed cassettes of the corresponding image forming device, respective copy counts for a plurality of paper sizes of the corresponding image forming device, a total number of paper jam events of the corresponding image forming device, respective numbers of paper jam events for the plurality of paper sizes of the corresponding image forming device, and respective numbers of paper jam events for a plurality of sheet transport positions of the corresponding image forming device.

(b) Reading and setting of the adjustment values of the control voltage, the control current, the resistance, and the timing in the respective units of a corresponding one of the image forming devices 1-5.

(c) Transmission of the results of the control of the communications mentioned in the above item (2) from the image forming devices 1-5 back to the central control system 6.

The control functions (a) through (c) described above are carried out by executing a selecting process for the image forming devices 1-5 by the data communication device 7 after a command signal sent by the central control system 6 is received by the data communication device 7. The selecting process means that the data communication device 7 selects one of the image forming devices 1-5 and performs a communication between the data communication device 7 and the selected image forming device.

Figure 7:
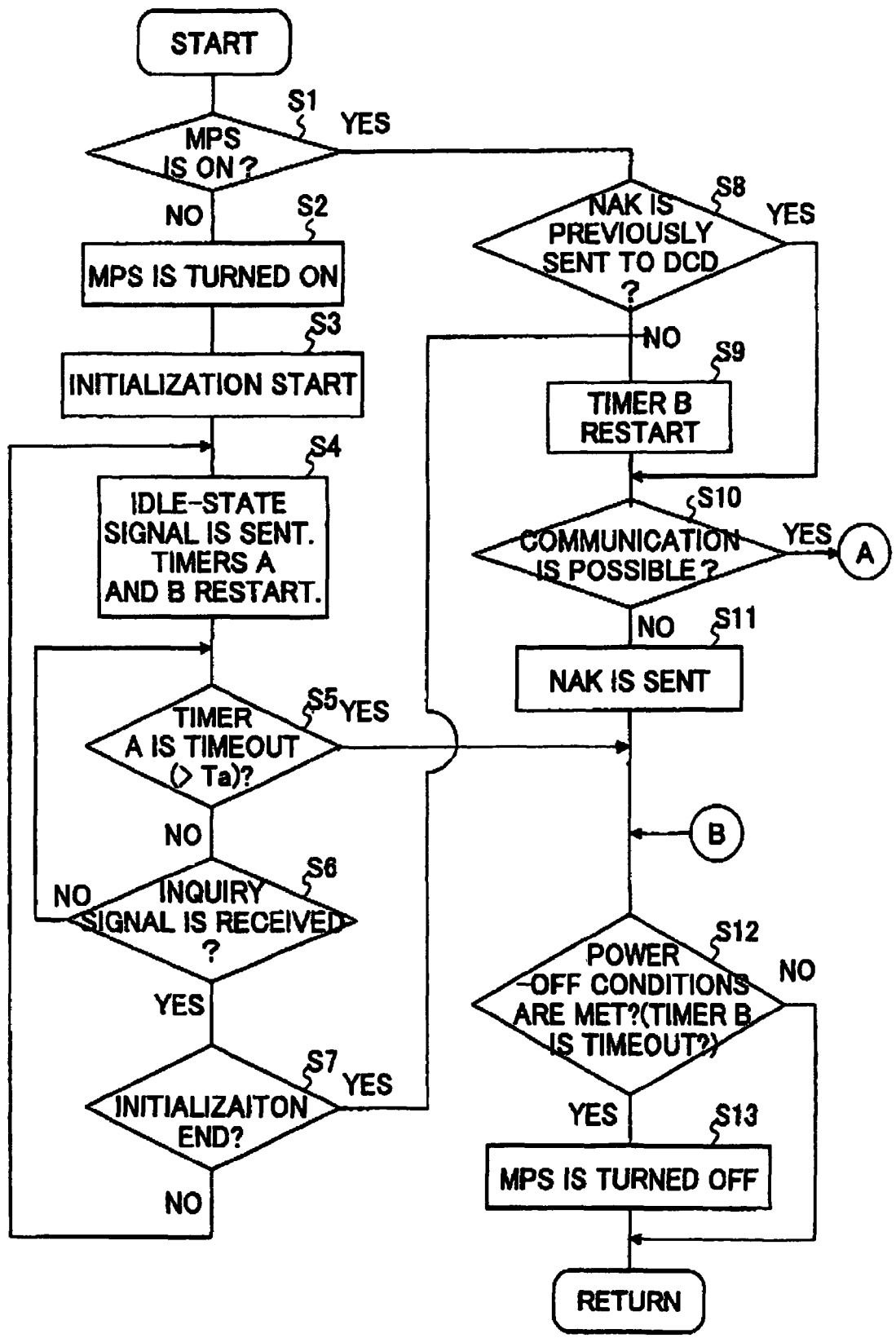
FIG. 7 is a flowchart for explaining a first half of a control procedure executed by the personal interface of the image forming device shown in FIG. 3.
Figure 8:
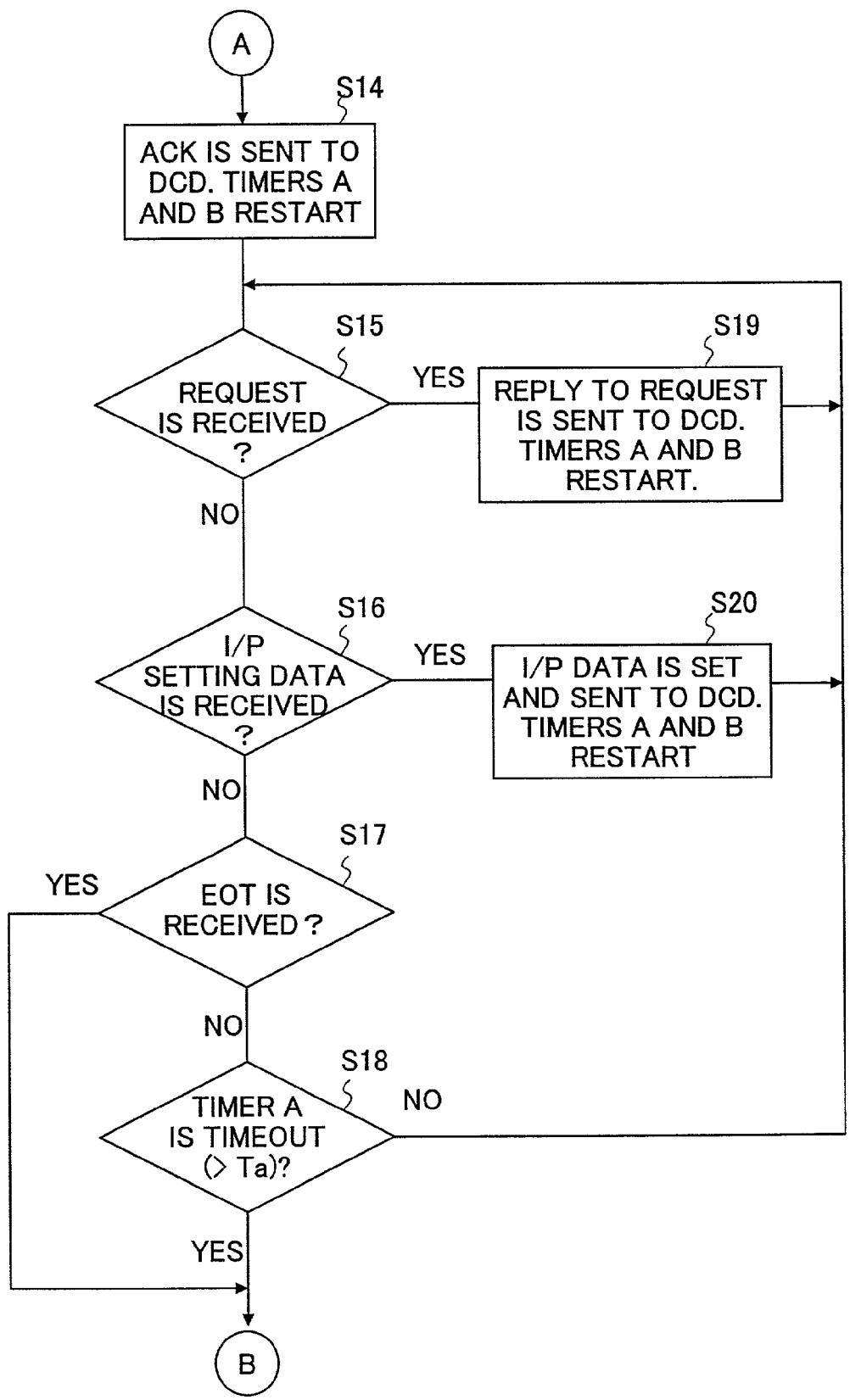
FIG. 8 is a flowchart for explaining a second half of the control procedure executed by the personal interface of the image forming device.

FIG. 7 and FIG. 8 show the first and second halves of a control procedure which is executed by the personal interface (PI) 18 of one of the image forming devices 1 through 5 during the selecting process of the data communication device 7.

Figure 9:
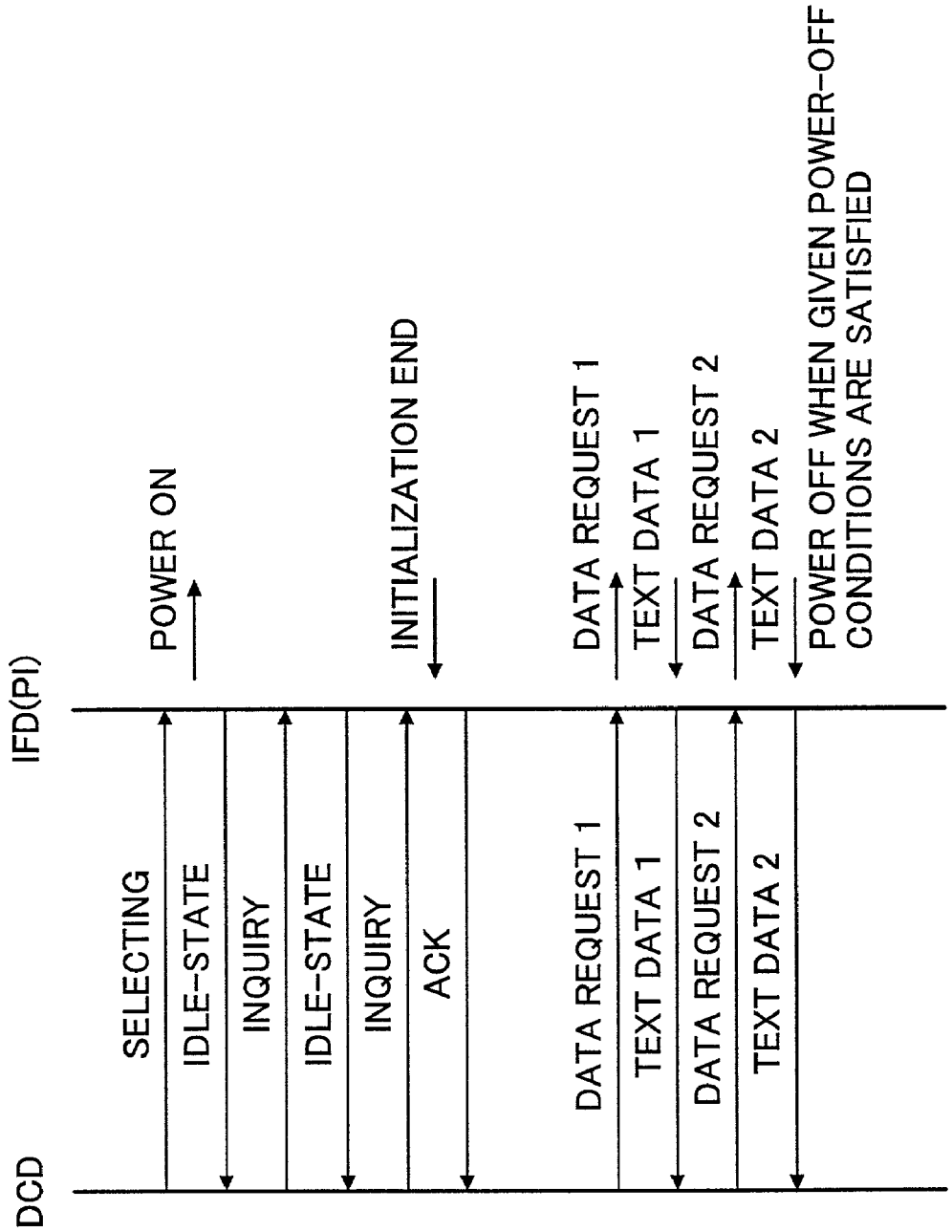
FIG. 9 is a diagram for explaining a communication sequence between the personal interface of one of the image forming devices and the data communication device.

FIG. 9 shows a communication sequence between the personal interface (PI) 18 of one of the image forming devices 1-5 and the data communication device 7.

In the selecting process, it is assumed that each of the image forming devices 1-5 has a specific device code, and the data communication device 7 sends a selecting signal, including a predefined code (or a combination of predefined codes) of the selecting process and a specific device code of the image forming device designated, to the SCI 38 (which uses the RS-485 interface) of each of the image forming devices 1-5.

Each of the image forming devices 1-5, connected to the data communication device 7, checks the process code included in the selecting signal sent by the data communication device 7, and compares the device code followed by the process code in the selecting signal, with the specific device code assigned for the corresponding image forming device. When the former device code matches with the latter device code, the corresponding image forming device recognizes that it is selected by the selecting process of the data communication device 7.

In each of the image forming devices 1-5, the small electric power from the SPS 21 is supplied to the PI 18 and the PI 18 is always active or in the power-on state. The CPU 31, included in the PI 18, detects whether the MPS 20 is in the power-on state or in the power-off state, based on the on/off state signal received from the MPS 20.

Upon start of the selecting process, the central control system (CSS) 6 transmits a command signal (or a communication request signal) to the data communication device (DCD) 7 via the PSTN 8. Then, the DCD 7 transmits the selecting signal (or the communication request signal), including the device code of the image forming device selected, to the image forming devices 1-5. When the selecting signal from the DCD 7 is received at the image forming device concerned among the image forming devices 1-5, the CPU 31 of the PI 18 starts execution of the control procedure of FIG. 7 and FIG. 8 (a sub-routine) through a calling of a main routine (not shown).

As shown in FIG. 7, at a start of the control procedure, the CPU 31 of the PI 18 of the image forming device concerned (hereinafter, called the CPU 31) at step S1 determines whether the main power source (MPS) 20 is the power-on state.

When the result of the step S8 is affirmative, the CPU 31 at step S8 determines whether a negative acknowledge signal (NAK) is previously sent to the DCD 7 in the previous cycle of the execution.

When the result of the step S8 is negative, no negative acknowledge signal (NAK) is previously sent to the DCD 7, and the CPU 31 at step S9 resets a timer B (which will be described later) and restarts the timer B so that a time measurement based on the time count of the timer B is started. After the step S9 is performed, the control of the CPU 31 is transferred to the next step S10, which will be described later.

When the result of the step S8 is affirmative, it is determined that a negative acknowledge signal (NAK) is previously sent to the DCD 7 in the previous cycle, and the CPU 31 does not perform the step S9 and the control of the CPU 31 is transferred to the next step S10, which will be described later.

On the other hand, when the result of the step S1 is negative, it is determined that the MPS 20 is in the power-off state. The CPU 31 at step S2 turns on the MPS 20 to start the supplying of the electric power from the MPS 20 to the image forming device concerned. The CPU 31 at step S3 transmits an initialize command signal to the CPU 11 of the PPC controller 41 so that the CPU 11 starts the initialization of the image forming device concerned.

At this instant, in the PPC controller 41 of the image forming device concerned, the internal parameters are not yet established, and any communication between the DCD 7 and the PPC controller 41 is impossible.

In order to overcome this problem, the CPU 31 of the PI 18 at step S4 continuously sends an idle-state signal (or an inaccessibility signal) to the DCD 7 during a time period from a time the supplying of the power started by the CPU 31 to a time the initialization of the image forming device ends in response to an inquiry signal received from the DCD 7. Further, in the step S4, the CPU 31 resets both a timer A (which will be described later) and the timer B, and restarts the timers A and B.

In the present embodiment, the CPU 31 is provided with the timer A to determine whether an error occurs in the communication between the image forming device concerned and the DCD 7. When an error in the communication between the image forming device and the DCD 7 occurs, the timer A is timeout, and an error message is displayed on the character display unit 83. The error message will notify the operator of the occurrence of the communication error. A reference period Ta that is slightly longer than a time required for a normal communication between the image forming device and the DCD 7 is predetermined for the timer A. When a time count of the timer A after the start of the communication exceeds the reference period Ta, it is determined that the timer A is timeout and a communication error has occurred.

In the present embodiment, the CPU 31 is provided with the timer B to determine whether the image forming device continuously stays in an inactive state for a long time period, exceeding a given reference period Tb (for example, one hour), after an image forming action (copying action) is terminated by the image forming device. When a time count of the timer B after the end of the latest image forming action with the image forming device staying in the inactive state exceeds the given reference period Tb, it is determined that the timer B is timeout. At this time, the MPS 20 is automatically set in the power-off state, for the purpose of reduction of the power consumption.

In addition, the timer B is reset and restarted by a command signal from the CPU 11 at a time the image forming device starts the image forming action or is set in a specific operational mode. This is repeatedly performed to prevent the timeout condition of the timer B from too often occurring. In the present embodiment, the resetting and restarting of the timer B is frequently performed, and the setting of the MPS 20 in the power-off state is not so often performed. In the present embodiment, the reference period Tb of the timer B is larger than the reference period Ta of the timer A (Ta<Tb).

In the control procedure of FIG. 7, after the step S4 is performed, the CPU 31 at step S5 determines whether the time count of the timer A exceeds the reference period Ta (or determines whether the timer A is timeout). When the result of the step S5 is negative, the CPU 31 at step S6 determines whether an inquiry signal sent by the DCD 7 is received at the image forming device. On the other hand, when the result of the step S5 is affirmative, the control of the CPU 31 is transferred to step S12 (which will be described later). Namely, when the timer A is timeout but the initialization of the image forming device does not end, the CPU 31 performs the step S12 and subsequent steps.

When the result of the step S6 is affirmative, the CPU 31 at step S7 determines whether the initialization of the image forming device (or the PPC controller 41) ends. When the result of the step S6 is negative, the control of the CPU 31 is transferred to the above step S5.

When the result of the step S7 is negative, the control of the CPU 31 is transferred to the above step S4. When the result of the step S7 is affirmative, the control of the CPU 31 is transferred to the above step S9. Namely, when the timer A is not timeout and the inquiry signal sent by the DCD 7 is received and the initialization of the image forming device ends, the CPU 31 performs the step S9 and subsequent steps.

In the present embodiment, when the idle-state signal sent by the image forming device concerned (which is designated as the selected image forming device by the selecting signal) is received at the DCD 7, the DCD 7 determines that the PPC controller 41 of the image forming device concerned is currently in the idle state. After two or three seconds, the DCD 7 transmits an inquiry signal to the image forming device concerned. If the idle-state signal is received again at the DCD 7, the DCD 7 determines that the PPC controller 41 of the image forming device concerned is currently in the idle state. Similarly, after two or three seconds, the DCD 7 transmits again an inquiry signal to the image forming device concerned. See the communication sequence of FIG. 9.

In the control procedure of FIG. 7, the CPU 31 at step S10 determines whether a communication between the image forming device concerned and the DCD 7 is possible. For example, even if the MPS 20 is in the power-on state, the image forming device concerned may be set in a specific operation mode in which the communication is impossible or an error may occur in the communication between the image forming device concerned and the DCD 7. In order to check such possibilities, the CPU 31 performs the above determination at the step S10.

When the result of the step S10 is negative, it is determined that the communication is impossible. The CPU 31 at step S11 transmits a negative acknowledge signal (NAK) to the DCD 7. On the other hand, when the result of the step S10 is affirmative, it is determined that the communication is possible, and the control of the CPU 31 is transferred to step S14 shown in FIG. 8 (which will be described later).

After the step S11 is performed, the CPU 31 at step S12 determines whether the image forming device concerned satisfies given power-off conditions that are used to turn off the MPS 20.

In the step S12, when the timer B is not timeout (the time count of the timer B does not exceed the reference period Tb), it is determined that the image forming device concerned does not satisfy the power-off conditions. Then, the control procedure of FIG. 7 is terminated and the control of the CPU 31 is returned to the main routine. A control procedure of another sub-routine will be performed.

In the step S12, when the timer B is timeout (the time count of the timer B exceeds the reference period Tb), it is determined that the image forming device concerned satisfies the power-off conditions, namely, the image forming device concerned stays in the inactive state for an excessively long time period. The CPU 31 at step S13 turns off the MPS 20 to inhibit the supplying of the electric power from the MPS 20 to the image forming device concerned. After the step S13 is performed, the control procedure of FIG. 7 is terminated and the control of the CPU 31 is returned to the main routine. A control procedure of another sub-routine will be performed.

When the NAK sent by the image forming device concerned is received at the DCD 7, the DCD 7 determines that it is currently unable to communicate with the image forming device, and terminates the selecting process. Then, the control of the DCD 7 is transferred to the polling process or the like, which will be described later.

As described above, when the result of the step S10 of FIG. 7 is affirmative, it is determined that the communication is possible, and the control of the CPU 31 is transferred to step S14 shown in FIG. 8.

As shown in FIG. 8, the CPU 31 at step S14 transmits an acknowledge signal (ACK) to the DCD 7 in order to start the communication between the image forming device concerned and the DCD 7. Further, in the step S14, the CPU 31 resets the timers A and B and restarts the timers A and B.

After the step S14 is performed, the CPU 31 at step S15 determines whether an internal parameter (I/P) request signal (which requests the reading of the internal parameters, such as fixing temperature setting FTS or total copy count TCC, of the copier) sent by the DCD 7 is received at the image forming device concerned.

When the result of the step S15 is affirmative, the CPU 31 at step S19 transmits a response to the I/P request to the DCD 7. Further, in the step S19, the CPU 31 resets the timers A and B and restarts the timers A and B. After the step S19 is performed, the control of the CPU 31 is transferred to the above step S15.

When the result of the step S15 is negative, the CPU 31 at step S16 determines whether an internal parameter (I/P) setting request signal (which requests the writing of the internal parameters, such as high-voltage unit setting HVS value or toner density setting TDS value, to the PPC controller 41) sent by the DCD 7 is received at the image forming device concerned.

When the result of the step S16 is affirmative, the CPU 31 at step S20 sends a command signal to the CPU 11 so as to write the I/P setting value to the PPC controller 41. In the step S20, the CPU 31 transmits the I/P value, written to the PPC controller 41, to the DCD 7. Further, in the step S20, the CPU 31 resets the timers A and B and restarts the timers A and B. After the step S20 is performed, the control of the CPU 31 is transferred to the above step S15.

The DCD 7 compares the I/P setting data sent to the image forming device concerned with the I/P value received from the CPU 31, and determines whether the I/P setting to the PPC controller 41 is correctly performed. When the communication between the DCD 7 and the image forming device concerned is finished, the DCD 7 sends an end-of-transmission signal (EOT) to the image forming device concerned.

When the result of the step S16 is negative, it is determined that the I/P setting request signal is not received, and the CPU 31 at step S17 determines whether an end-of-transmission signal (EOT) sent by the DCD 7 is received at the image forming device concerned.

When the result of the step S17 is affirmative, it is determined that the EOT sent by the DCD 7 is received, and the control of the CPU 31 is transferred to the above step S12 shown in FIG. 7.

When the result of the step S17 is negative, it is determined that the EOT is not received, and the CPU 31 at step S18 determines whether the time count of the timer A exceeds the reference period Ta (or determines whether the timer A is timeout).

When the result of the step S18 is negative, the control of the CPU 31 is transferred to the above step S15. On the other hand, when the result of the step S18 is affirmative, the control of the CPU 31 is transferred to the above step S12 shown in FIG. 7.

In the above-described control procedure, before the timer A is timeout, the steps S15 through S20 are repeatedly performed until the EOT sent by the DCD 7 is received. When the EOT is received before the timer A is timeout, the above steps S12 and S13 are performed in which it is determined whether the power-off conditions are satisfied and the MPS 20 is turned off if the timer B is timeout. In addition, when the timer A is timeout before the EOT is received, the above steps S12 and S13 are also performed.

In the above-described control procedure, in the step S12, it is determined whether the power-off conditions are satisfied (or determines whether the timer B is timeout). When the control of the CPU 31 is transferred from the step S5, the step S17 or the step S18 to the step S12, the result of the step S12 will be negative, and the control is returned to the main routine.

Incidentally, it is supposed that the MPS 20 is in the power-on state during a control procedure of the other sub-routine to which the control of the CPU 31 is transferred after the end of the control procedure of FIG. 7. In such a case, the CPU 31 determines that the image forming device concerned satisfies the power-off conditions, if the main switch is turned off by the operator or if the timer B is timeout. As a result of this determination, the CPU 31 turns off the MPS 20 to inhibit the supplying of the electric power from the MPS 20 to the image forming device concerned.

In addition, in the present embodiment, when the timer A is timeout, it is determined that an error occurs in the communication between the image forming device and the DCD 7. At this time, the CPU 31 sends a command signal to the CPU 11, which causes the CPU 11 to display an error message on the character display unit 83. The error message will notify the operator of the occurrence of the communication error.

In the image forming device management system and method of the above-described embodiment, even when the main switch of the image forming device concerned is turned off by the operator or when the automatic power-off function is effected in order to reduce the power consumption, the MPS 20 is automatically turned on upon receipt of a communication request signal sent by the DCD 7, and the supplying of the power from the MPS 20 to the image forming device concerned is automatically turned off after the communication between the DCD 7 and the image forming device concerned ends. Accordingly, the image forming device management system and method of the above-described embodiment can always start the communication between the DCD 7 and the image forming device concerned even if the image forming device concerned is temporarily held in a power-off state.

Regarding the control of communications from the image forming devices 1-5 to the central control system 6 as mentioned in the above item (2), the image forming device management system of the present embodiment provide the following five functions (a) through (e).

(a) Sending an error message (an emergency message) from a corresponding one of the image forming devices 1-5 to the data communication device 7 and to the central control system 6 via the PSTN 8 when a malfunction in the corresponding one of the image forming devices 1-5 takes place.

(b) Sending a repair request (an emergency message) from a corresponding one of the image forming devices 1-5 to the data communication device 7 and to the central control system 6 via the PSTN 8 when a repair request message window appears on the character display unit 83 of the corresponding one of the image forming devices 1-5 and a repair request transmit button of the repair request message window is depressed by the operator.

(c) Sending a usage data or a supply request (an emergency message) from a corresponding one of the image forming devices 1-5 to the data communication device 7 and to the central control system 6 via the PSTN 8 when a contract copy count (or a predetermined count number of copies) is reached by the total copy count of the corresponding one of the image forming devices 1-5 is reached.

(d) Sending, on a normal message date for a corresponding one of the image forming devices 1-5, a usage data thereof (a non-emergency message) from the corresponding one of the image forming devices 1-5 to the data communication device 7 and to the central control system 6 via the PSTN 8 when the current date and time of the corresponding one of the image forming device 1-5 matches with a predetermined date and time.

(e) Sending, on a normal message date for a corresponding one of the image forming devices 1-5, a supply request or a maintenance request thereof (a non-emergency message) from the corresponding one of the image forming devices 1-5 to the data communication device 7 and to the central control system 6 via the PSTN 8 when a maintenance event (such as a change of consumable materials or a supply of copy sheets) in the corresponding one of the image forming device 1-5 takes place.

The control functions (a) through (e) described above are carried out by executing a polling process for the image forming devices 1-5 by the data communication device 7. The polling process means that the data communication device 7 sequentially designates one of the image forming devices 1-5 and confirms the reception of a communication request from each selected image forming device at the data communication device 7.

Figure 10:
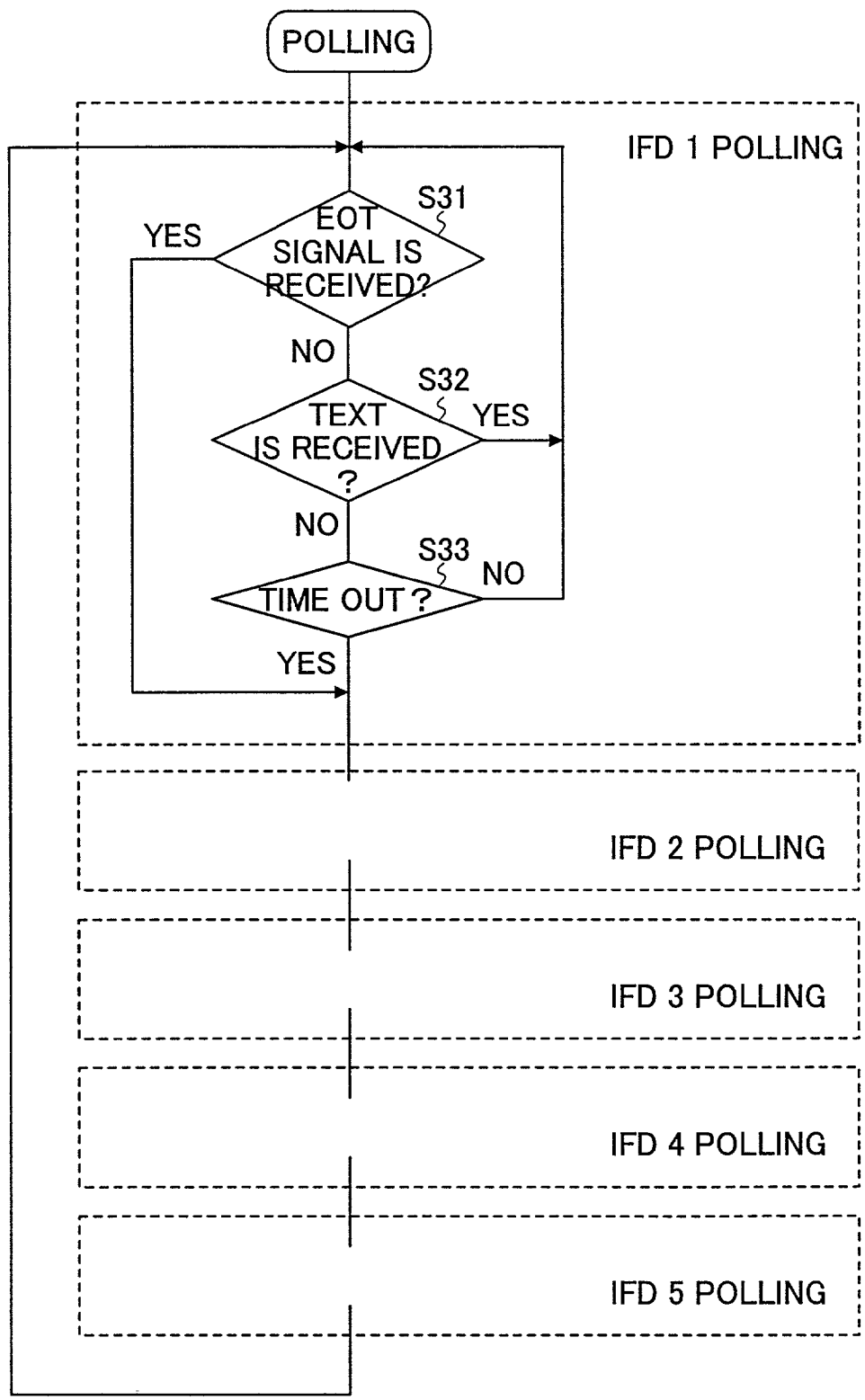
FIG. 10 is a flowchart for explaining a polling process executed by the data communication device of FIG. 6.

FIG. 10 shows a polling process that is executed by the data communication device of FIG. 6.

In the polling process shown in FIG. 10, it is assumed that each of the image forming devices 1-5 has a specific device code, and the data communication device 7 sends a predefined code (or a combination of predefined codes) of the polling process and a device code of the image forming device to be designated, to the SCI 38 (which uses the RS-485 interface) of each of the image forming devices 1-5.

Each of the image forming devices 1-5, connected to the data communication device 7, checks the process code sent by the data communication device 7 and compares the device code followed by the process code, with the specific device code assigned for the corresponding image forming device. When the former device code matches with the latter device code, the corresponding image forming device recognizes that it is designated for the polling process by the data communication device 7. When the designated image forming device has a text data (or a transmission request being sent to the data communication device 7 or to the central control system 6), the image forming device starts the communication with the data communication device 7. On the other hand, when the designated image forming device has no transmission request, or when the communication is terminated, the image forming device sends a communication end reply (a predefined code or a combination of predefined codes) to the data communication device 7 to terminate the communication with the data communication device 7.

As shown in FIG. 10, the data communication device 7 at step S31 determines whether an end-of-transmission (EOT) signal, sent by the designated one (in this case, the image forming device 1) of the image forming devices 1-5, is received at the data communication device 7. When the result of the step S31 is affirmative, the control of the data communication device 7 is transferred to a following polling process for the image forming device 2.

When the result of the step S31 is negative, the data communication device 7 at step S32 determines whether a text data, sent by the designated one of the image forming devices 1-5, is received at the data communication device 7. When the result of the step S32 is affirmative, the control of the data communication device 7 is returned to the above step S31.

On the other hand, when the result of the step S32 is negative, the data communication device 7 at step S33 determines whether a predetermined time period has elapsed. When the result of the step S33 is affirmative, the control of the data communication device 7 is transferred to the following polling process for the image forming device 2. Otherwise the control of the data communication device 7 is returned to the above step S31.

When a corresponding one of the image forming devices 1-5 for the device code output by the data communication device 7 is in the off state, the corresponding image forming device cannot start the communication with the data communication device 7 or cannot send a communication end reply to the data communication device 7. Hence, after the predetermined time period has elapsed, the data communication device 7 terminates the polling process for the corresponding image forming device. Unless the selecting process is started, the polling process is sequentially performed for the image forming devices 1 through 5 connected to the data communication device 7 as shown in FIG. 10.

Regarding the control of the data communication device 7 itself as mentioned in the above item (3), there are two functions (a) and (b) that follows.

(a) Reading a total copy count from each of the image forming devices 1-5.

(b) Sending a result of the communication, performed by the control mentioned in the above item (2), from a corresponding one of the image forming devices 1-5 to the data communication device 7.

The reading of the total copy count in the above control function (a) is carried out by the data communication device 7 by executing the selecting process for the image forming devices 1-5 by the data communication device 7 at a regular time of every day (for example, 00:00). When the corresponding image forming device is in the off state during the selecting process, the selecting process will be executed as soon as the corresponding image forming device is turned on.

The data communication device 7 is provided with two memories (which are called a memory A and a memory B) for storing the total copy count of a corresponding one of the image forming devices 1-5. The total copy count (or the usage data of the corresponding image forming device), read through the selecting process, is stored in the memory A. As the selecting process is performed at a regular time of every day, the previous total copy count stored in the memory A is updated by a new total copy count read through the selecting process every day. Suppose that the corresponding image forming device is not in the off state during the selecting process.

On a predetermined monthly message date and time that is set in the backup RAM of the data communication device 7 by the central control system 7, the total copy count of the memory A is copied to the memory B in the data communication device 7, and the data communication device transmits, on the message date, the total copy count of the memory B to the central control system 6.

There are two methods (a) and (b) of the reception of the total copy count sent by the data communication device 7 at the central control system 6:

(a) The central control system 6 receives the total copy count (stored in the memory B) of a corresponding one of the image forming devices 1-5 from the data communication device 7 by using a call sent by the central control system 6 at a date and time that is subsequent to the monthly message date and time.

(b) The data communication device 7 transmits the total copy count (stored in the memory B) of a corresponding one of the image forming devices 1-5 to the central control system 6 by using a call sent by the data communication device 7 at a date and time that is subsequent to the monthly message date and time.

Further, the data communication device 7 may be provided with a plurality of pairs of the memories A and B for storing several sub-total copy counts (monochrome copies, application copies, color copies, and others) for each of the image forming devices 1-5.

Figure 11:
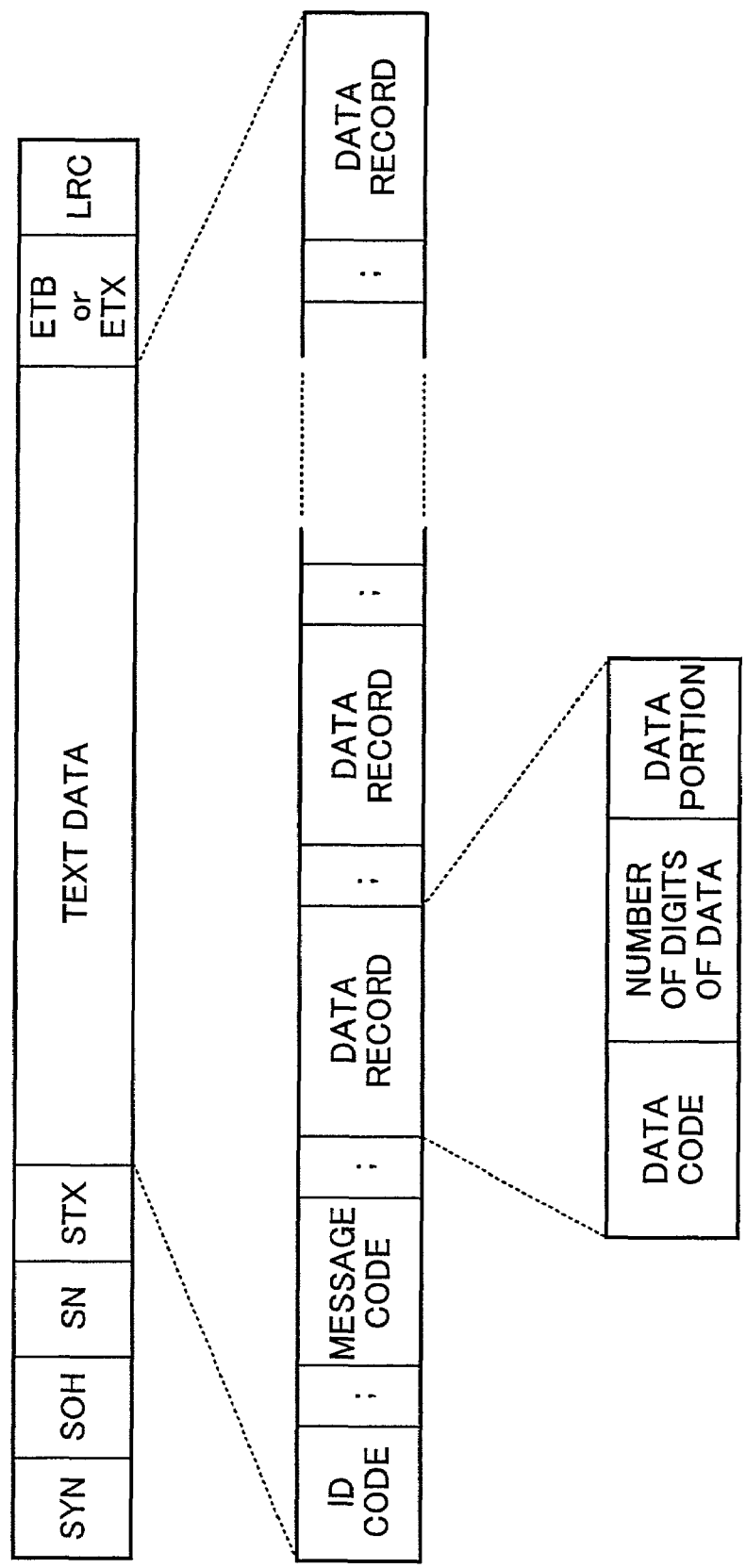
FIG. 11 is a diagram for explaining the data format of a text data that is transmitted between the central control system and the data communication device.

FIG. 11 shows the data format of a text data that is transmitted between the central control system 6 and the data communication device 7.

As shown in FIG. 11, a header portion of the text data includes a serial number (SN) that indicates a data block number of one of a sequence of data blocks transmitted at a time. The SN of a first data block is indicated by "01", and the SN of a subsequent data block is indicated by a 2-digit number of "02" through "99". The ID code of the text data is a device number indicating a specific one of the image forming devices 1-5 and the data communication device 7. The message code of the text data is indicated by a process code with a message source ID and a message destination ID attached. The process code, contained in the message code, indicates a specific type of the text data message transmitted, and this process code is predefined as in the following TABLE 1.

TABLE 1

| CODE | PROCESS NAME | DESCRIPTION |
|---|---|---|
| 30 | SERVICE CALL (SC) | AUTO MESSAGE BY SC |
| 31 | MANUAL CALL (MC) | AUTO MESSAGE BY MC SW |
| 32 | ALARM TRANSMIT | AUTO MESSAGE BY ALARM |
| 22 | BLOCK BILLING | AUTO MESSAGE WHEN BILLING LEVEL IS REACHED |
| 02 | DATA READING | READ DATA FROM PPC CNTL. |
| 04 | DATA WRITING | WRITE DATA TO PPC CNTL. |

TABLE 1-continued

| CODE | PROCESS NAME | DESCRIPTION |
|---|---|---|
| 03 | EXECUTION | TEST BY REMOTE OPERATIN |
| 08 | DEVICE CODE CHECK | COMMUNICATION FUNCTION CHECKING |

In the data format of FIG. 11, each of a plurality of data records in the text data is divided into a data code, the number of digits of data and a data portion, which are predefined as in the following TABLE 2. TABLE 2.

TABLE 2

| CODE | DATA LENGTH | DESCRIPTION |
|---|---|---|
| DATA CODE | 11 | A CODE INDICATING A KIND OF DATA |
| NO. OF DIGITS | 2 | A LENGTH OF DATA PORTION. ASCII CODES. IN CASE OF NO DATA PORTION: "00". |
| DATA RECORD | VARIABLE | THE CONTENTS OF EACH DATA PORTION |

Figure 12:
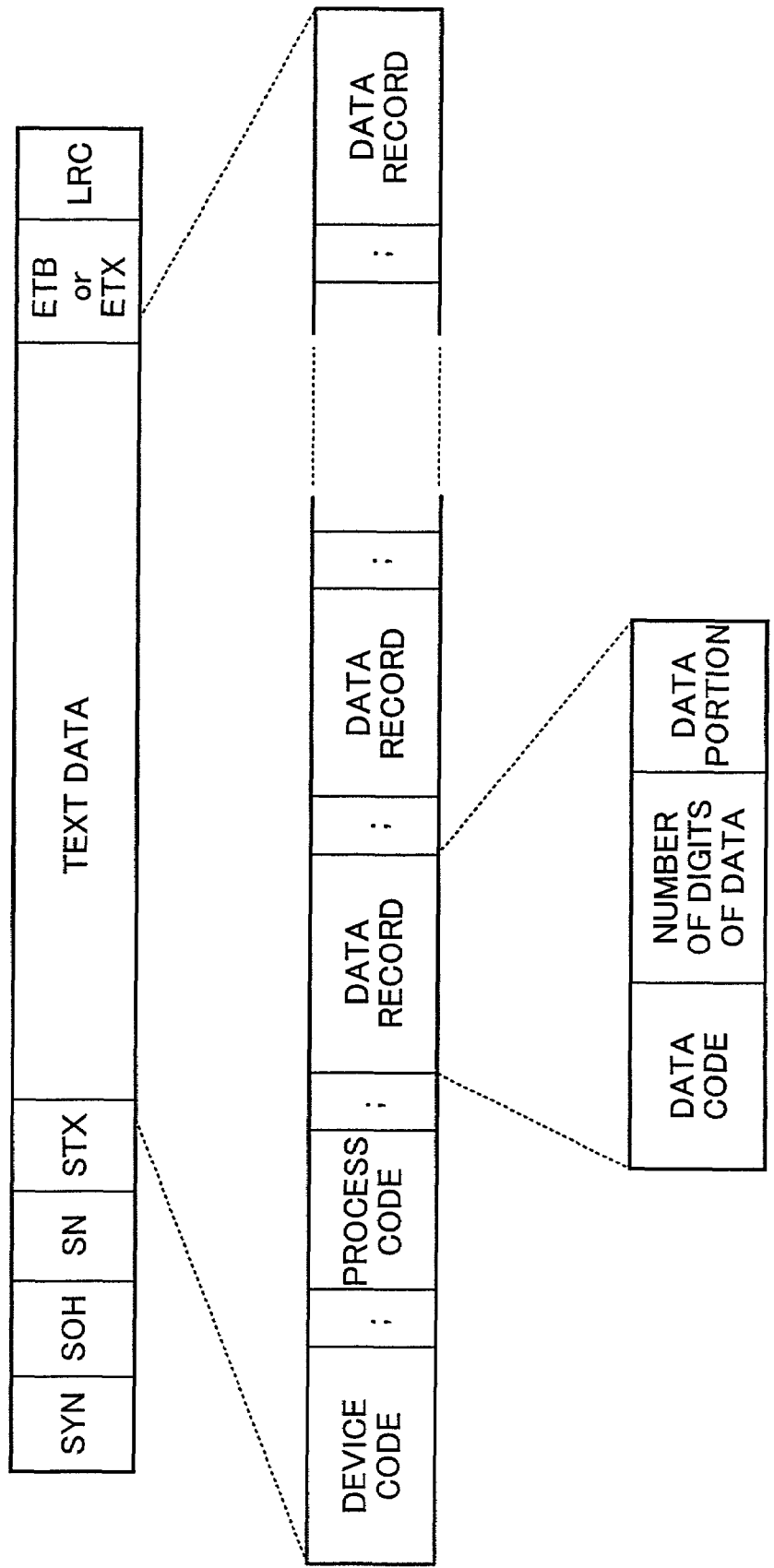
FIG. 12 is a diagram for explaining the data format of a text data that is transmitted between the data communication device and the personal interface of the image forming device.

FIG. 12 shows the data format of a text data that is transmitted between the data communication device 7 and the personal interface (PI) 18 of each of the image forming devices 1-5.

In the data format of FIG. 12, the device code is a device number that indicates a specific one of the image forming devices 1-5. Each device code of the image forming devices 1-5 is preset by using the device-code setting switch 40 (FIG. 3). The correlation of the ID code of FIG. 10 and the device code of FIG. 11 is stored in the backup RAM of the data communication device 7 when the image forming device is initially connected to the data communication device 7. The process code of FIG. 12 corresponds to the message code of FIG. 11 from which the message source ID and the message destination ID are removed as described.

Figure 13:
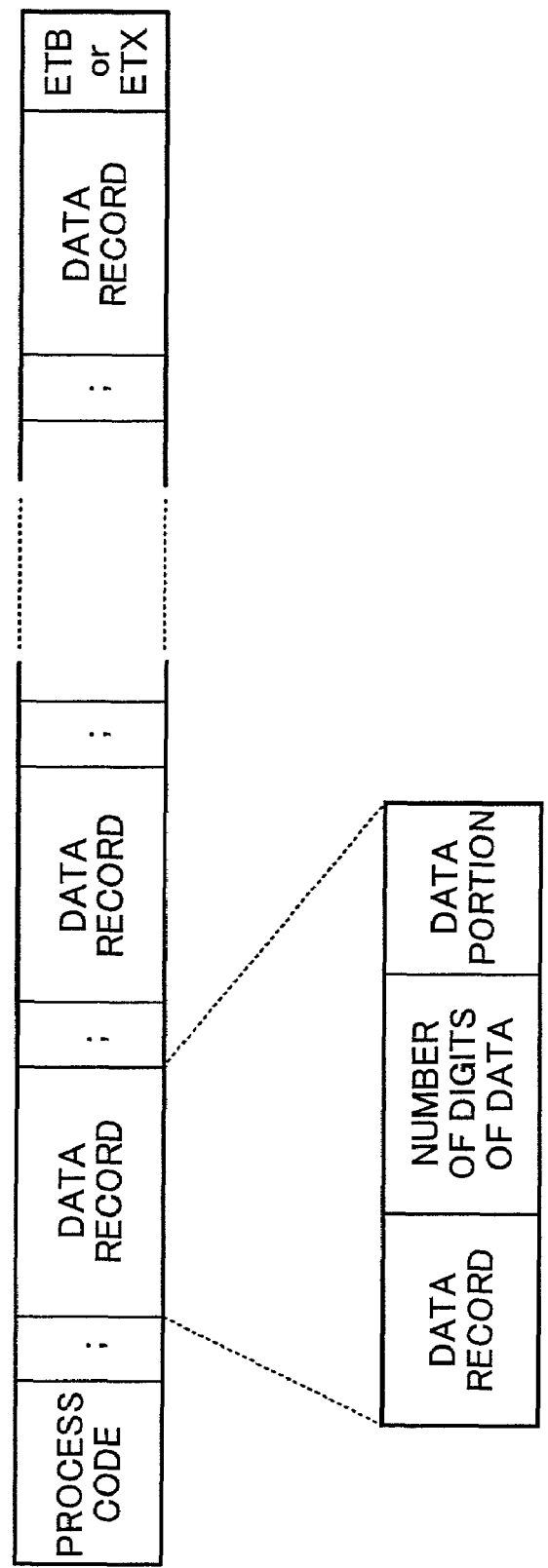
FIG. 13 is a diagram for explaining the data format of a text data that is transmitted between the personal interface and the PPC controller.

FIG. 13 shows the data format of a text data that is transmitted between the personal interface (PI) 18 and the PPC controller 41 within each of the image forming devices 1 through 5. The text data of FIG. 13 corresponds to the text data of FIG. 12 from which the header portion (SYN, SOH, SN, STX), the parity portion (LRC) and the device code are removed.

Next, FIG. 14A, FIG. 14B and FIG. 14C are diagrams for explaining a communication sequence between the data communication device (DCD) 7, the personal interface (PI) 18 and the PPC controller 41 of the image forming device when a polling process is performed.

FIG. 14A shows a communication sequence between the DCD 7, the PI 18 and the PPC controller 41 in a case of the image forming device having a data that is transmitted to the DCD 7 in the polling process. FIG. 14B shows a communication sequence between the DCD 7, the PI 18 and the PPC controller 41 in a case of the image forming device having no data that is transmitted to the DCD 7 in the polling process. FIG. 14C shows a format of a polling signal that is sent to the image forming device by the DCD 7.

As shown in FIG. 14C, the second byte of the 4-byte polling signal contains "1" (31H), which allows the image forming device to detect that the signal received from the DCD 7 is a polling signal. The third byte of the polling signal contains a specific device code of the image forming device, which allows the image forming device to identify the destination device of the signal received from the DCD 7.

As described above, in the image forming device management system of the present embodiment, the polling process is performed by the DCD 7 for the image forming devices 1-5. In the polling process, the DCD 7 determines whether each selected device of the image forming devices 1-5 has a data that should be transmitted to the DCD 7. If one of the image forming devices 1-5 has such data, the image forming device transmits the data to the DCD 7 in response to the received polling signal.

When the DCD 7 and the image forming devices 1-5 are actually installed in the customer system, the image forming devices 1-5 are connected in parallel to the DCD 7. Each of the image forming devices 1-5 has a specific device code that is predefined for each image forming device by using the device-code setting switch 40. In the polling process, the DCD 7 sends the polling signal, containing the polling process code and the device code of the image forming device designated (as shown in FIG. 14C), to the SCI 38 (which uses the RS-485 interface) of each of the image forming devices 1-5.

Each of the image forming devices 1-5 checks the process code in the polling signal received from the DCD 7, and compares the device code followed by the process code in the received polling signal, with the specific device code assigned for the corresponding image forming device. When the device code of the polling signal matches with the device code assigned for the image forming device, the image forming device recognizes that it is designated for the polling process by the DCD 7. When the selected image forming device has a text data (or a transmission request being sent to the DCD 7 or to the CCS 6), the image forming device starts the communication with the DCD 7 to transmit the data to the DCD 7 as shown in FIG. 14A.

On the other hand, when the selected image forming device has no data that is transmitted to the DCD 7, the image forming device simply sends an end-of-transmission signal (EOT) to the DCD 7 to terminate the communication with the DCD 7 as shown in FIG. 14B.

As is apparent from the polling signal format of FIG. 14C, the personal interface (PI) 18 of the image forming device responds to the polling signal only when the device code of the received polling signal matches with the specific device code assigned for the image forming device by using the device-code setting switch 40. Otherwise the PI 18 of the image forming device discards the polling signal sent by the DCD 7.

The selected one of the image forming devices 1-5 transmits the data to the DCD 7 in response to the polling signal sent by the DCD 7. If the intervals at which the DCD 7 sends the polling signal to the image forming devices 1-5 are large, the transmission of the data from the selected image forming device to the DCD 7 requires a long time. If the intervals of sending of the polling signal are small, the communication between the DCD 7 and the image forming devices 1-5 must be frequently performed, and the processing load on the image forming devices 1-5 is increased. By taking the above matters into consideration, the DCD 7 in the present embodiment is configured to transmit the polling signal to the image forming devices 1-5 at the intervals of about 3 seconds.

Figure 15A:
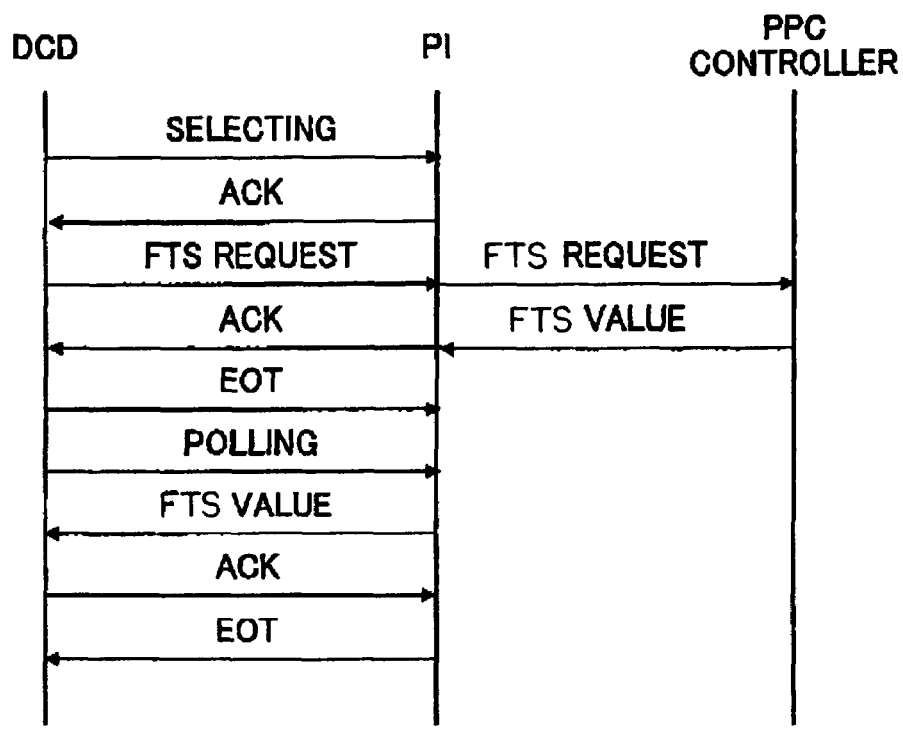
FIG. 15A and FIG. 15B are diagrams for explaining a communication sequence between the data communication device, the personal interface and the PPC controller of the image forming device when a selecting process is performed.
Figure 15B:
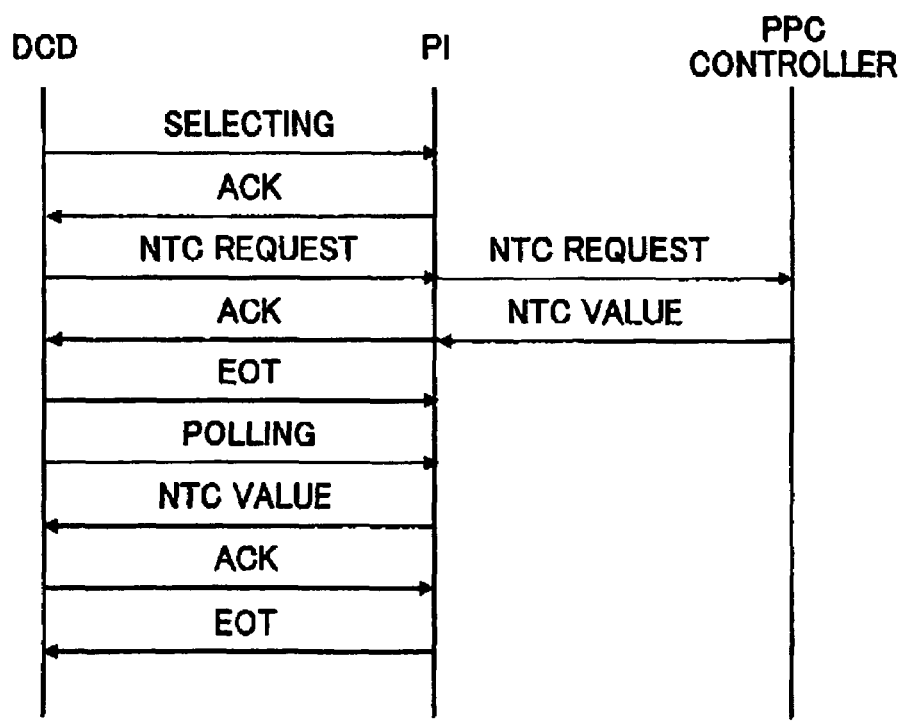

Next, FIG. 15A and FIG. 15B are diagrams for explaining a communication sequence between the DCD 7, the PI 18 and the PPC controller 41 of the image forming device when a selecting process is performed.

In the image forming device management system of the present embodiment, the selecting process is performed by the DCD 7 either for the reading of the internal parameter (I/P) setting from the selected image forming device or for the writing of a new internal parameter (I/P) value to the selected image forming device.

FIG. 15A shows a communication sequence between the DCD 7, the PI 18 and the PPC controller 41 when a fixing temperature setting (FTS) request signal is sent from the DCD 7 to the selected image forming device in the selecting process. The FTS request signal is an example of an internal parameter (I/P) setting request signal that is sent from the DCD 7 (or the CCS 6) to the selected image forming device.

As shown in FIG. 15A, the selecting process is performed by the DCD 7 in order for the reading of the internal parameter (I/P) setting from the selected image forming device. Specifically, in the example of FIG. 15A, the fixing temperature setting (FTS) request signal is sent from the DCD 7 to the selected image forming device in the selecting process. Each of the image forming devices 1-5 checks the process code in the selecting signal received from the DCD 7, and compares the device code followed by the process code in the received selecting signal, with the specific device code assigned for the corresponding image forming device. When the device code of the selecting signal matches with the device code assigned for the image forming device, the image forming device recognizes that it is selected for the selecting process by the DCD 7. When the match occurs, the selected image forming device sends an acknowledge signal (ACK) to the DCD 7.

As shown in FIG. 15A, the polling process is performed by the DCD 7, at the end of the selecting process, in order to send a FTS value, which is set in the selected image forming device, from the PI 18 to the DCD 7.

Further, in the present embodiment, the selecting process is performed by the DCD 7 for the writing of a new internal parameter (I/P) value to the selected image forming device, for the starting or terminating of a specific operational mode (free running mode) in the selected image forming device, or for the setting of a specific electronic counter into a new total copy count value.

FIG. 15B shows a communication sequence between the DCD 7, the PI 18 and the PPC controller 41 when a new total copy-count setting (NTC) request signal is sent from the DCD 7 to the selected image forming device in the selecting process. The NTC request signal is an example of the internal parameter (I/P) setting request signal that is sent from the DCD 7 (or the CCS 6) to the selected image forming device.

As shown in FIG. 15B, the selecting process is performed by the DCD 7 in order for the writing of the internal parameter (I/P) setting value to the selected image forming device. Specifically, in the example of FIG. 15B, the new total copy-count setting (NTC) request signal is sent from the DCD 7 to the selected image forming device in the selecting process.

When the match between the device code of the selecting signal and the device code assigned for the image forming device occurs, the selected image forming device sends an acknowledge signal (ACK) to the DCD 7. Upon receipt of the ACK signal, it is determined that the selected image forming device is ready for receiving the NTC request signal, and the DCD 7 sends the NTC request signal, including the new total copy-count setting (NTC) information, to the selected image forming device. The PI 18 of the selected image forming device sends the NTC request signal to the PPC controller 41, and the PPC controller 41 writes an NTC value, based on the received NTC information, to the internal counter of the PPC controller 41. After the writing of the NTC value is performed, the PPC controller 41 sends the NTC value back to the PI 18.

As shown in FIG. 15B, the polling process is performed by the DCD 7 at the end of the selecting process, in order to send the NTC value, which is written to the selected image forming device, from the PI 18 back to the DCD 7. Upon receipt of the polling signal sent from the DCD 7, the PI 18 of the selected image forming device transmits the NTC value to the DCD 7. As the NTC value is received at the DCD 7 (or the CCS 6), the DCD 7 (or the CCS 6) compares the total copy count of the received NTC value with the total copy count of the NTC request signal. When the match occurs, the DCD 7 (or the CCS 6) recognizes that the NTC value has been correctly written to the selected image forming device.

Next, FIG. 16A, FIG. 16B and FIG. 16C show a communication sequence between the DCD 7, the PI 18 and the PPC controller 41 of the image forming device when a selecting process is performed to start or terminate a specific operational mode (or a free running mode) of the image forming device.

FIG. 16A shows a communication sequence between the DCD 7, the PI 18 and the PPC controller 41 when the free running mode of the image forming device is started in the selecting process. FIG. 16B shows a communication sequence between the DCD 7, the PI 18 and the PPC controller 41 when the free running mode of the image forming device is terminated in the selecting process. FIG. 16C shows a format of a selecting signal that is sent to the image forming device by the DCD 7.

As shown in FIG. 16C, the second byte of the 4-byte selecting signal contains "2" (32H), which allows the image forming device to detect that the signal received from the DCD 7 is a selecting signal. The third byte of the selecting signal contains a specific device code of the image forming device, which allows the image forming device to identify the destination device of the signal received from the DCD 7.

In the present embodiment, the selecting process is performed by the DCD 7 (or the CCS 6) as the I/P request arises. Therefore, it is not necessary that, at appropriate intervals, the DCD 7 send the selecting signal to the image forming devices 1-5.

In the present embodiment, the image forming device management system is configured by using the selecting process such that the PI 18 of each image forming device automatically turns on, when a selecting signal (or a communication request signal), which is sent by the DCD 7 and designates the image forming device as the destination device of the selecting process, is received by the image forming device, the supplying of the power from the MPS 20 to the image forming device.

As described above, the selecting process is performed by the DCD 7 (or the CCS 6) as the I/P request arises. Therefore, the use of the selecting process, rather than the use of the polling process, is more appropriate. If the polling process, which is usually performed at the intervals of about 3 seconds, is used to automatically set the image forming device in the power-on state, the frequency of setting of the image forming device in the power-on state becomes significantly high, which will decrease the effects of reduction of the power consumption.

As described above, the image forming device management system of one preferred embodiment of the invention is configured by using the selecting process such that the PI 18 of each image forming device automatically turns on, when a selecting signal, which is sent by the DCD 7 and designates the image forming device concerned as the destination device of the selecting process, is received by the image forming device concerned, the supplying of the power from the MPS 20 to the image forming device concerned. In most cases, however, it is not necessary to supply the power from the MPS 20 to all of the respective portions of the image forming device when the setting of the image forming device in the power-on state is performed by using the selecting process. When the I/P setting request arises on the CCS 6 or the DCD 7, it is sufficient to supply the power from the MPS 20 to some of the plurality of portions of the image forming device to receive the I/P setting value from the image forming device. By this configuration, it is possible to achieve a reduction of the power consumption of the image forming device.

In order to achieve the above-mentioned object, the image forming device management system of the present embodiment is provided with the following functions (A) and (B).

(A) Each image forming device has a power-supplied portion setting switch that sets, in advance, any of the plurality of portions of the image forming device as being power-supplied portions to which the power from the MPS 20 is to be supplied.

(B) The DCD 7 (or the CCS 6) has a function to transmit a power-supplied portion selection signal to the image forming device concerned, so that any of the plurality of portions of the image forming device concerned are selected, in advance, in accordance with the power-supplied portion selection signal as being the power-supplied portions.

Regarding the above function (A), the image forming device management system is configured such that each image forming device includes a power-supplied portion setting unit which sets, in advance, any of the plurality of portions of the image forming device as being power-supplied portions to which the power from the MPS 20 is to be supplied, such that the PI 18 automatically turns on, when the selecting signal is received by the image forming device, the supplying of the power from the MPS 20 to only the power-supplied portions of the image forming device.

Regarding the above function (B), the image forming device management system is configured such that the control portion 51 of the DCD 7 includes a power-supplied portion selection unit which transmits a power-supplied portion selection signal to the image forming device concerned, so that any of the plurality of portions of the image forming device concerned are selected, in advance, in accordance with the power-supplied portion selection signal as being the power-supplied portions. The PI 18 of each image forming device automatically turns on, when the selecting signal is received at the image forming device, the supplying of the power from the MPS 20 to only the power-supplied portions of the image forming device.

Figure 17:
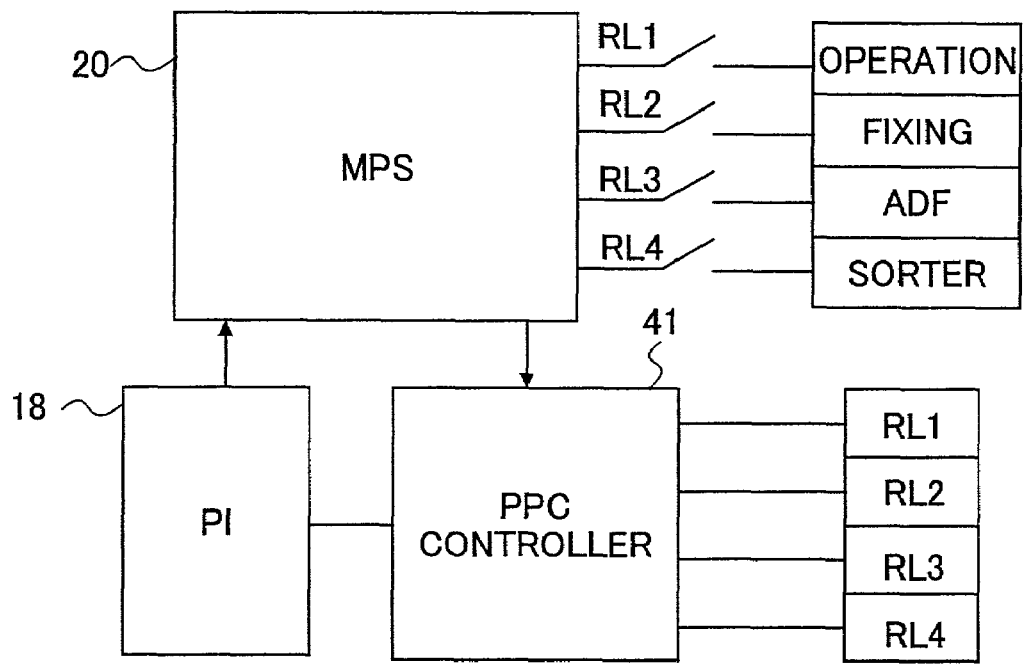
FIG. 17 is a block diagram of a main power source in the image forming device.

FIG. 17 shows a configuration of the main power source (MPS) 20 in the image forming device.

As shown in FIG. 17, it is assumed that the image forming device has a plurality of portions, including an operation portion, a fixing portion, an ADF portion and a sorter portion. In the present embodiment, the main power source (MPS) 20 of the image forming device is provided with a power-supplied portion setting unit that includes a plurality of relays RL1, RL2, RL3 and RL4, which are respectively connected to the operation portion, the fixing portion, the ADF portion and the sorter portion. When one of these portions of the image forming device is set in the power-supplied portion in the power-supplied portion setting unit, a corresponding one of the plurality of relays is turned on to establish an electric connection between the MPS 20 and the corresponding one of these portions of the image forming device through the relay. Therefore, when the selecting signal is received at the image forming device, the PI 18 of the image forming device automatically turns on the supplying of the power from the MPS 20 to only the power-supplied portions of the image forming device.

Further, in the above-described embodiment, the image forming device management system is configured such that the CPU 11 of each image forming device includes a power-supplied portion display unit which displays, on the character display unit 83 of the operation/display portion, power-supplied portion information that indicates which of the portions of the image forming device are set as being the power-supplied portions.

Figure 18:
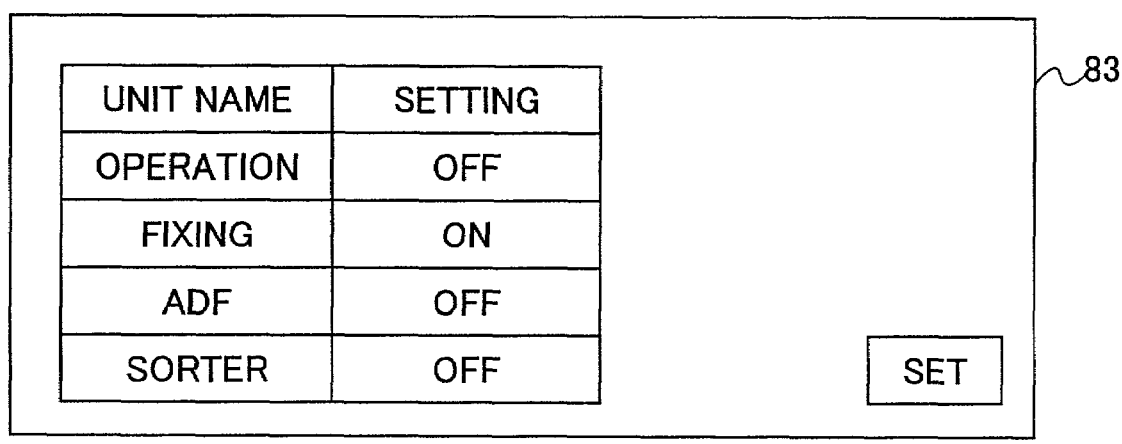
FIG. 18 is a diagram showing a power-supplied portion setting mode window of the character display unit in the operation/display portion of FIG. 4.

FIG. 18 shows a power-supplied portion setting mode window of the character display unit 83 in the operation/display portion of FIG. 4.

When the image forming device is set in a service process operational mode (which is usually used by a service person rather than by a user), the power-supplied portion setting mode window shown in FIG. 18 appears on the character display unit 83 in the operation/display portion of FIG. 4. When the power-supplied portion selection signal sent by the DCD 7 (or the CCS 6) is received at the image forming device, the operator of the image forming device can select, in advance, any of the plurality of portions of the image forming device in accordance with the power-supplied portion selection signal as being the power-supplied portions while viewing the power-supplied portion setting mode window of FIG. 18.

The PI 18 of the image forming device receives the communication request signal from the DCD 7 (or the CCS 6), and, when the MPS 20 is in the power-off state, the PI 18 sends the MPS control signal (or the power-on signal) to the MPS 20 so that the MPS 20 is automatically turned on. The PPC controller 41 controls the respective relays RL1-RL4 of the MPS 20 in accordance with the power-supplied portion setting, and the power from the MPS 20 is supplied to only the power-supplied portions of the image forming device through the on-state relays of the MPS 20. The power-supplied portion setting can be modified by using the power-supplied portion setting mode window shown in FIG. 18.

In the above-described embodiment, when the main switch of the image forming device is turned on by the operator, the MPS 20 is turned on to supply the power from the MPS 20 to all of the portions of the image forming device, regardless of the power-supplied portion setting that is determined in the service process mode.

As described above, the image forming device management system of the present embodiment is configured such that the control portion 51 of the DCD 7 includes a power-supplied portion selection unit which transmits a power-supplied portion selection signal to the image forming device concerned, so that any of the plurality of portions of the image forming device concerned are selected, in advance, in accordance with the power-supplied portion selection signal as being the power-supplied portions. The PI 18 of each image forming device automatically turns on, when the selecting signal is received at the image forming device, the supplying of the power from the MPS 20 to only the power-supplied portions of the image forming device.

Figures 19, 20:
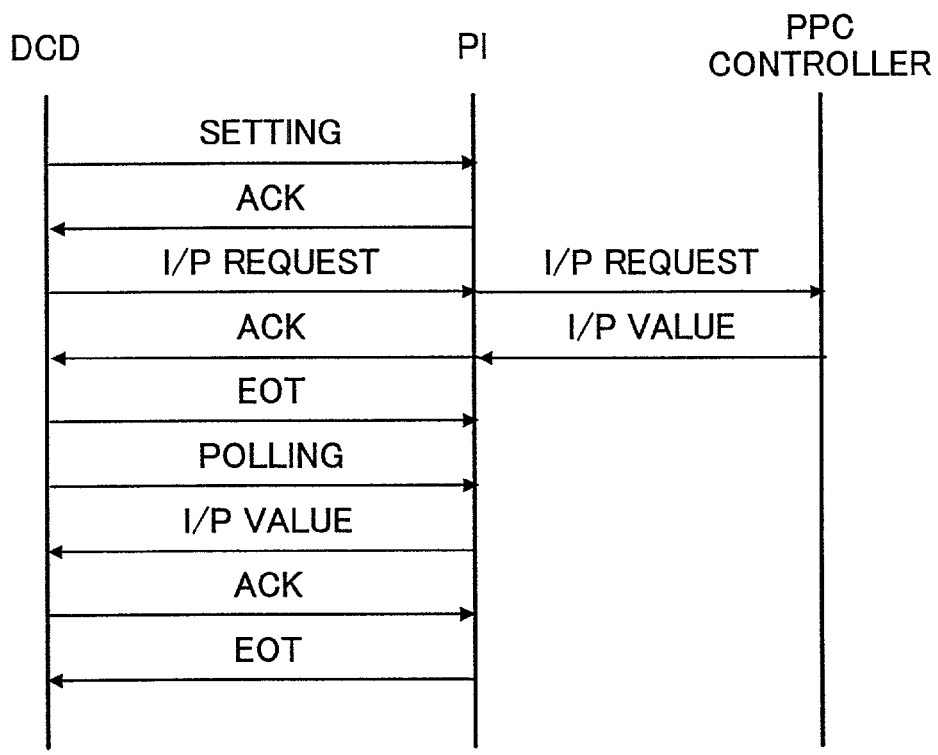
FIG. 19 is a diagram for explaining a communication sequence between the data communication device, the personal interface and the PPC controller of the image forming device when a power-supplied portion selection signal is sent from the data communication device to the image forming device.
FIG. 20 is a diagram for explaining a format of an internal parameter request signal used in the communication sequence of FIG. 19.

FIG. 19 shows a communication sequence between the data communication device (DCD) 7, the personal interface (PI) 18 and the PPC controller 41 of the image forming device when a power-supplied portion selection signal is sent from the DCD 7 to the image forming device.

Specifically, in the example of FIG. 19, the internal parameter setting (I/P) request signal (for example, the fixing temperature setting (FTS) request signal) is sent from the DCD 7 to the selected image forming device in the selecting process. The above configuration of the image forming device management system of the present embodiment is achieved by transmitting the I/P request signal, containing the power-supplied (P/S) portion selection information, from the DCD 7 to the selected image forming device.

FIG. 20 shows a format of an internal parameter setting (I/P) request signal used in the communication sequence of FIG. 19. As shown in FIG. 20, the I/P request signal, which is sent from the DCD 7 to the selected image forming device, includes both internal parameter setting (I/P) request information and power-supplied (P/S) portion selection information.

In the communication sequence shown in FIG. 19, the DCD 7 transmits the I/P request signal, containing the power-supplied (P/S) portion selection information, to the PI 18 of the selected image forming device. When the I/P request signal from the DCD 7 is received at the image forming device, the PI 18 checks the P/S portion selection information contained in the I/P request signal, and controls the setting of the power-supplied portions of the image forming device in accordance with the P/S portion selection information.

FIG. 21A and FIG. 21B show the details of power-supplied (P/S) portion selection information and internal parameter setting (I/P) request information included in the I/P request signal shown in FIG. 20.

As described above, when the I/P request signal from the DCD 7 (or the CCS 6) is received at the image forming device, the PI 18 checks the P/S portion selection information contained in the I/P request signal. As shown in FIG. 21A, the P/S portion selection information is a 1-byte signal including eights bits which respectively correspond to the power-on/off selections of the portions of the image forming device. For example, the first bit of the 1-byte P/S portion selection information indicates the power on/off selection of the operation portion, and the second bit of the same indicates the power-on/off selection of the fixing portion. Therefore, the PI 18 controls the setting of the power-supplied portions of the image forming device by switching on or off the respective relays of the MPS 20 in accordance with the P/S portion selection information.

Further, in the communication sequence shown in FIG. 19, when the I/P request signal from the DCD 7 is received at the image forming device, the PI 18 checks the I/P request information contained in the I/P request signal. Specifically, in the example of FIG. 21B, the I/P request information, included in the I/P request signal, is a predefined command code that indicates the fixing temperature setting (FTS) request. The PI 18 transfers the I/P request signal, which is received from the DCD7, to the PPC controller 41 without change, as shown in FIG. 19.

FIG. 22 shows a format of a power-supplied (P/S) portion selection signal which may be sent from the data communication device (DCD) 7 to the image forming device after the reading or updating of the internal parameters of the image forming device is finished.

When turning on the MPS 20 of the image forming device is unnecessary after the reading or updating of the internal parameters of the image forming device is finished, the DCD 7 may transmit the P/S portion selection signal, as shown in FIG. 22, to the image forming device. The details of the P/S portion selection information contained in the signal shown in FIG. 22 are essentially the same as those shown in FIG. 21A. By the sending of this signal, it is possible for the DCD 7 of the present embodiment to modify the setting of the power-on portions of the image forming device concerned at any intermediate times after the reading or updating of the internal parameters of the image forming device is finished.

In the above-described embodiment, the image forming device management system is configured such that, when the image forming device stays in the inactive state for a long time, exceeding the reference period, after the end of the communication between the DCD 7 and the image forming device, the MPS 20 is forcefully turned off to inhibit the supplying of the electric power from the MPS 20 to all of the portions of the image forming device, regardless of the contents of the power-on portions of the image forming device set by the P/S portion selection information.

Next, a description will be given of the relationship between the communication between the CCS 6 and the image forming device and the control procedure of the image forming device.

There is a case in which, when the updating of a specific internal parameter I/P (for example, drum current setting) of the image forming device is performed by sending a power-supplied portion selection signal from the CCS 6, the image forming device is in the process of the image forming action (copying). In such a case, if the drum current setting of the image forming device is updated in the process of the image forming action, the density of a reproduced image within one copy sheet is varied by the change of the drum current setting, causing the degradation of the quality of the reproduced image. In addition, when the ability of the CPU of the image forming device is not adequate, the CPU of the image forming device is unable to simultaneously carry out both the communication between the DCD 7 and the image forming device and the image forming action.

In order to eliminate the above-mentioned problems, the image forming device management system of the present embodiment is configured as in the following.

The image forming device management system of the present embodiment is configured such that, when the updating of a specific I/P (for example, drum current setting, fixing temperature setting or laser diode drive conditions) of the image forming device is performed in the process of the image forming action, the updating of the specific I/P is delayed until the image forming action is finished, and the updating of the specific I/P is performed after the end of the image forming action. This configuration makes it possible to prevent the undesired variation of the quality of a reproduced image within one copy sheet due to the updating of the internal parameter in the process of the image forming action.

In the case in which the ability of the CPU of the image forming device is not adequate, the image forming device management system of the present embodiment is configured such that, upon a start of the image forming action, the PPC controller 41 sends a busy-state signal to the PI 18 to inform that the image forming device is in the process of the image forming action. The PI 18 at this time is held in the inactive state (no signal or data can be exchanged between the PI 18 and the DCD 7 or the CCS 6) until the busy state of the PPC controller 41 is turned into a ready state. After the end of the image forming action, the PPC controller 41 sends a ready-state signal to the PI 18, and then the PI 18 is set in the active state so that the PI 18 can start the communication with the DCD 7 or the CCS 6.

Similarly, in a case in which the emergency message process is performed by the CCS 6 or the DCD 7, the image forming device may be temporarily held in the inactive state until the emergency message process is finished, and the communication between the CCS 6 or the DCD 7 and the image forming device will be performed preference to the image forming action of the image forming device. The image forming device of the present embodiment may be configured such that the depression of a start button of the image forming device is made invalid when the emergency message process is performed by the CCS 6 or the DCD 7, so as to hold the image forming device in the inactive state during the emergency message process.

The present invention is not limited to the above-described embodiments, and variations and modifications may be made without departing from the scope of the present invention.

Further, the present invention is based on Japanese priority application No. 2000-022928, filed on Jan. 31, 2000, and Japanese priority application No. 2001-005675, filed on Jan. 12, 2001, the entire contents of which are hereby incorporated by reference.

What is claimed is:

1. An image forming device management system in which a data communication device is connected to one or a plurality of image forming devices and a central control system is connected to the data communication device via a communication network and provides a remote maintenance of the one of the plurality of image forming devices through the communication network and the data communication device, the image forming device management system comprising the one or the plurality of image forming devices, the data communication device, and the central control system, wherein each image forming device comprises a power-source on/off control unit automatically turning on, when a communication request signal sent by the data communication device is received by the image forming device, a supplying of a power from a main power source to the image forming device concerned, and the power-source on/off control unit automatically turning off the supplying of the power from the main power source to the image forming device after a communication between the data communication device and the image forming device ends, the data communication device comprises a power-supplied portion selection unit transmitting a power-supplied portion selection signal to the image forming device concerned, so that any of a plurality of portions of the image forming device concerned are selected, in advance, in accordance with the power-supplied portion selection signal as being the power-supplied portions, and the power-source on/off control unit of the image forming device concerned automatically turning on, when the communication request signal is received by the image forming device concerned, the supplying of the power from the main power source to only the power-supplied portions of the image forming device concerned, for which power to the power-supplied portions was previously turned off, wherein the power-supplied portion selection unit is configured to contain the power-supplied portion selection signal in an internal parameter request signal with respect to the image forming device concerned, and to transmit the internal parameter request signal, containing the power-supplied portion selection signal, to the image forming device concerned, so that the image forming device concerned simultaneously receives both the internal parameter request signal and the power-supplied portion selection signal, and said internal parameter request signal includes a signal that requests information from the image forming device concerned.

2. The image forming device management system according to claim 1, wherein the power-source on/off control unit of each image forming device is configured to automatically turn off the supplying of the power when the image forming device satisfies predetermined power-off conditions after the end of the communication between the data communication device and the image forming device.

3. The image forming device management system according to claim 1, wherein the power-source on/off control unit of each image forming device is configured such that the power-source on/off control unit determines that the image forming device satisfies power-off conditions, when a given time period has elapsed after the end of the communication, and that the power-source on/off control unit automatically turns off the supplying of the power in accordance with the determination.

4. The image forming device management system according to claim 1, wherein the power-source on/off control unit of each image forming device is configured such that the power-source on/off control unit determines that the image forming device satisfies power-off conditions, when a given time period has elapsed after the end of the communication with the image forming device staying in an inactive condition, and that the power-source on/off control unit automatically turns off the supplying of the power in accordance with the determination.

5. The image forming device management system according to claim 1, wherein each image forming device further comprises a signal send-back unit sending, during a period from a time the supplying of the power started by the power-source on/off control unit to a time an initialization of the image forming device ends, one of an idle-state signal and an inaccessibility signal to the data communication device in response to an inquiry signal from the data communication device.

6. The image forming device management system according to claim 1, wherein each image forming device further comprises:

a power-supplied portion setting unit setting, in advance, any of a plurality of portions of the image forming device as being power-supplied portions to which the power from the main power source is to be supplied, such that the power-source on/off control unit automatically turns on, when the communication request signal is received by the image forming device, the supplying of the power from the main power source to only the power-supplied portions of the image forming device; and a power-supplied portion display unit displaying, on an operation/display portion, power-supplied portion information that indicates which of the portions of the image forming device are set as being the power-supplied portions.

7. The image forming device management system according to claim 1, wherein, after reading or updating of internal parameters of the image forming device is completed, a second power-supplied portion selection signal is transmitted from the data communication device to the image forming device concerned so that the supplying of the power from the main power source to all the portions of the image forming device concerned is forcefully inhibited.

8. The image forming device management system according to claim 1, wherein the image forming device concerned includes a personal interface configured to check, when the internal parameter request signal is received, the power-supplied portion selection signal contained in the internal parameter request signal, and the power-source on/off control unit is configured to turn on the supplying of the power from the main power source to the power-supplied portions of the image forming device concerned in accordance with the power-supplied portion selection signal, wherein the personal interface is further configured to check, after the power is supplied from the main power source to the power supplied portions of the image forming device concerned, the signal that requests information from the image forming device concerned included in the internal parameter request signal, and to transmit the signal that requests information from the image forming device concerned to a controller, the controller configured to obtain information requested by the signal that requests information from the image forming device concerned.

9. A data communication device for use in an image forming device management system, the data communication device being connected to one or a plurality of image forming devices and a central control system being connected to the data communication device via a communication network and providing a remote maintenance of the one or the plurality of image forming devices through the communication network and the data communication device, the data communication device comprising a request signal transmission unit transmitting a communication request signal to the image forming device concerned among the one or the plurality of image forming devices, and the image forming device concerned automatically turning on, when the request signal is received by the image forming device concerned, a supplying of a power from a main power source to the image forming device concerned, wherein the data communication device comprises a power-supplied portion selection unit transmitting a power-supplied portion selection signal to the image forming device concerned, so that any of a plurality of portions of the image forming device concerned are selected, in advance, in accordance with the power-supplied portion selection signal as being power-supplied portions to which the power from the main power source is to be supplied, and the image forming device concerned automatically turning on, when the communication request signal is received by the image forming device concerned, the supplying of the power from the main power source to only the power-supplied portions of the image forming device concerned, for which power to the power-supplied portions was previously turned off, wherein the power-supplied portion selection unit is configured to contain the power-supplied portion selection signal in an internal parameter request signal with respect to the image forming device concerned, and to transmit the internal parameter request signal, containing the power-supplied portion selection signal, to the image forming device concerned, so that the image forming device concerned simultaneously receives both the internal parameter request signal and the power-supplied portion selection signal, and said internal parameter request signal includes a signal that requests information from the image forming device concerned.

10. The data communication device according to claim 9, wherein the request signal transmission unit transmits a selecting signal, which designates the image forming device concerned as a destination device, to the one or the plurality of image forming devices.

11. The data communication device according to claim 10, wherein the data communication device comprises an inquiry signal transmission unit that transmits an inquiry signal to the image forming device concerned when one of an idle-state signal and an inaccessibility signal that is to be sent by the image forming device concerned during a period from a time the image forming device concerned starts the supplying of the power to a time an initialization of the image forming device concerned ends, is not received by the data communication device.

12. The data communication device according to claim 9, wherein, after reading or updating of internal parameters of the image forming device is completed, a second power-supplied portion selection signal is transmitted from the data communication device to the image forming device concerned so that the supplying of the power from the main power source to all the portions of the image forming device concerned is forcefully inhibited.

13. An image forming device for use in an image forming device management system wherein a data communication device is connected to the image forming device and a central control system is connected to the data communication device via a communication network and provides a remote maintenance of the image forming device through the communication network and the data communication device, the image forming device comprising:

a power-source on/off control unit automatically turning on, when a communication request signal sent by the data communication device is received by the image forming device, a supplying of a power from a main power source to the image forming device, and the power-source on/off control unit automatically turning off the supplying of the power from the main power source to the image forming device after a communication between the data communication device and the image forming device ends;

the data communication device comprising a power-supplied portion selection unit transmitting a power supplied portion selection signal to the image forming device, so that any of a plurality of portions of the image forming device are selected, in advance, in accordance with the power-supplied portion selection signal as being the power supplied portions, wherein the power-source on/off control unit of the image forming device automatically turning on, when the communication request signal is received by the image forming device, the supplying of the power from the main power source to only the power-supplied portions of the image forming device, for which power supplied to the power-supplied portions was previously turned off, the power-supplied portion selection unit is configured to contain the power-supplied portion selection signal in an internal parameter request signal with respect to the image forming device concerned, and to transmit the internal parameter request signal, containing the power-supplied portion selection signal, to the image forming device concerned, so that the image forming device concerned simultaneously receives both the internal parameter request signal and the power-supplied portion selection signal, and said internal parameter request signal includes a signal that requests information from the image forming device concerned.

14. The image forming device according to claim 13, wherein the power-source on/off control unit is configured to automatically turn off the supplying of the power when the image forming device satisfies predetermined power-off conditions after the end of the communication between the data communication device and the image forming device.

15. The image forming device according to claim 13, wherein the power-source on/off control unit is configured such that the power-source on/off control unit determines that the image forming device satisfies power-off conditions, when a given time period has elapsed after the end of the communication, and that the power-source on/off control unit automatically turns off the supplying of the power in accordance with the determination.

16. The image forming device according to claim 13, wherein the power-source on/off control unit is configured such that the power-source on/off control unit determines that the image forming device satisfies power-off conditions, when a given time period has elapsed after the end of the communication with the image forming device staying in an inactive condition, and that the power-source on/off control unit automatically turns off the supplying of the power in accordance with the determination.

17. The image forming device according to claim 13, further comprising a signal send-back unit sending, during a period from a time the power-source on/off control unit starts the supplying of the power to a time an initialization of the image forming device ends, one of an idle-state signal and an inaccessibility signal to the data communication device in response to an inquiry signal from the data communication device.

18. The image forming device according to claim 13, further comprising:

a power-supplied portion setting unit setting, in advance, any of a plurality of portion of the image forming device as being power-supplied portions to which the power from the main power source is to be supplied, wherein the power-source on/off control unit automatically turns on, when the communication request signal is received by the image forming device, the supplying of the power from the main power source to only the power-supplied portions of the image forming device; and a power-supplied portion display unit displaying, on an operation/display portion, power-supplied portion information that indicates which of the portions of the image forming device are set as being the power-supplied portions.

19. The image forming device according to claim 13, wherein, after reading or updating of internal parameters of the image forming device is completed, a second power-supplied portion selection signal is transmitted from the data communication device to the image forming device concerned so that the supplying of the power from the main power source to all the portions of the image forming device concerned is forcefully inhibited.

20. The image forming device according to claim 13, wherein the image forming device concerned includes a personal interface configured to check, when the internal parameter request signal is received, the power-supplied portion selection signal contained in the internal parameter request signal, and the power-source on/off control unit is further configured to turn on the supplying of the power from the main power source to the power-supplied portions of the image forming device concerned in accordance with the power-supplied portion selection signal, wherein the personal interface is further configured to check, after the power is supplied from the main power source to the power supplied portions of the image forming device concerned, the signal that requests information from the image forming device concerned included in the internal parameter request signal, and to transmit the signal that requests information from the image forming device concerned to a controller, the controller configured to obtain information requested by the signal that requests information from the image forming device concerned.

21. An image forming device management method in which a data communication device is connected to one or a plurality of image forming devices and a central control system is connected to the data communication device via a communication network and provides a remote maintenance of the one or the plurality of image forming devices through the communication network and the data communication device, comprising:

transmitting a communication request signal from the data communication device to the image forming device concerned;

transmitting a power-supplied portion selection signal from a portion selection unit to the image forming device concerned, so that any of a plurality of portions of the image forming devices concerned are selected, in advance, in accordance with the power-supplied portion selection signal as being power-supplied portions;

automatically turning on, when the request signal is received by the image forming device concerned, a supplying of a power from a main power source to only the power-supplied portions of the image forming device concerned; and automatically turning off the supplying of the power from the main power source to the power-supplied portion of the image forming device concerned after a communication between the data communication device and the image forming device concerned ends, for which power supplied to the power-supplied portions was previously turned off, wherein the power-supplied portion selection signal is contained in an internal parameter request signal with respect to the image forming device concerned, and is configured to transmit the internal parameter request signal, containing the power-supplied portion selection signal, to the image forming device concerned, so that the image forming device concerned simultaneously receives both the internal parameter request signal and the power-supplied portion selection signal, and said internal parameter request signal includes a signal that requests information from the image forming device concerned.

22. The image forming device management method according to claim 21, wherein, after reading or updating of internal parameters of the image forming device is completed, a second power-supplied portion selection signal is transmitted from the data communication device to the image forming device concerned so that the supplying of the power from the main power source to all the portions of the image forming device concerned is forcefully inhibited.

* * * * *